United States Patent
Kaneta et al.

(10) Patent No.: US 11,787,913 B2
(45) Date of Patent: Oct. 17, 2023

(54) SIZING AGENT FOR CARBON FIBERS, AQUEOUS DISPERSION OF SIZING AGENT FOR CARBON FIBERS, AND SIZING AGENT-ADHERED CARBON FIBER BUNDLE

(71) Applicant: Mitsubishi Chemical Corporation, Chiyoda-ku (JP)

(72) Inventors: Kenji Kaneta, Tokyo (JP); Takaaki Suzuki, Tokyo (JP); Kouki Wakabayashi, Tokyo (JP); Akihiro Ito, Tokyo (JP); Naoki Sugiura, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 342 days.

(21) Appl. No.: 16/392,190

(22) Filed: Apr. 23, 2019

(65) Prior Publication Data
US 2019/0249358 A1    Aug. 15, 2019

Related U.S. Application Data

(63) Continuation of application No. PCT/JP2017/039066, filed on Oct. 30, 2017.

(30) Foreign Application Priority Data

Oct. 28, 2016  (JP) .................................. 2016-211672
Oct. 17, 2017  (JP) .................................. 2017-200941

(51) Int. Cl.
*C08J 5/04*        (2006.01)
*D06M 15/55*    (2006.01)
(Continued)

(52) U.S. Cl.
CPC .............. *C08J 5/042* (2013.01); *C08G 59/20* (2013.01); *C08J 5/06* (2013.01); *D06M 10/10* (2013.01);
(Continued)

(58) Field of Classification Search
CPC .... D06M 15/507; D06M 15/53; D06M 15/55; D06M 15/564; D06M 15/568;
(Continued)

(56) References Cited

U.S. PATENT DOCUMENTS 4,496,671 A    1/1985  Yoshinaga et al.
4,880,881 A    11/1989  Minami
(Continued)

FOREIGN PATENT DOCUMENTS

CN    1527895 A    9/2004
CN    102959154 A    3/2013
(Continued)

OTHER PUBLICATIONS

Partial machine translation of JP-2004204144-A (2020).*
(Continued)

*Primary Examiner* — Kregg T Brooks
(74) *Attorney, Agent, or Firm* — Oblon, McClelland, Maier & Neustadt, L.L.P.

(57) ABSTRACT

A sizing agent for carbon fiber includes component (A), component (B), and component (C), in which the component (A) is at least one selected from the group consisting of component (A-1), component (A-2), and component (A-3); the component (A-1) is a urethane compound having a structure of Formula (1-1) in the molecule, the component (A-2) is an ester compound having a structure represented by Formula (1-2) in the molecule, the component (A-3) is an amide compound having a structure of Formula (1-3) in the molecule; the component (B) is an epoxy compound selected from the group consisting of an epoxy compound represented by Formula (2), an epoxy compound represented by Formula (3), and an epoxy compound represented by Formula (4); and the component (C) is a bisphenol type epoxy compound.

9 Claims, 1 Drawing Sheet

(51) Int. Cl.
    *D06M 15/564*      (2006.01)
    *D06M 15/53*      (2006.01)
    *D06M 15/507*      (2006.01)
    *D06M 13/224*      (2006.01)
    *D06M 10/10*      (2006.01)
    *D06M 15/59*      (2006.01)
    *C08G 59/20*      (2006.01)
    *C08J 5/06*      (2006.01)
    *D06M 15/568*      (2006.01)
    *D06M 101/40*      (2006.01)

(52) U.S. Cl.
    CPC ........ *D06M 13/224* (2013.01); *D06M 15/507* (2013.01); *D06M 15/53* (2013.01); *D06M 15/55* (2013.01); *D06M 15/564* (2013.01); *D06M 15/568* (2013.01); *D06M 15/59* (2013.01); *C08J 2300/24* (2013.01); *C08J 2363/00* (2013.01); *D06M 2101/40* (2013.01); *D06M 2200/40* (2013.01)

(58) Field of Classification Search
    CPC .. D06M 15/59; D06M 13/11; D06M 2200/40; D06M 2101/40; C08L 63/00–10; C09D 163/00–10; C09J 163/00–10; C08J 2363/00–10; C08J 2463/00–10
    See application file for complete search history.

(56) References Cited

U.S. PATENT DOCUMENTS

| | | | | |
|---|---|---|---|---|
| 7,150,913 | B2 * | 12/2006 | Sugiura | D06M 7/00 428/408 |
| 2004/0191511 | A1 | 9/2004 | Sugiura et al. | |
| 2006/0099366 | A1 * | 5/2006 | Takemoto | B29C 70/44 428/36.1 |
| 2011/0279546 | A1 * | 11/2011 | Kihara | B41J 2/14072 347/50 |
| 2015/0247025 | A1 | 9/2015 | Ichikawa et al. | |
| 2017/0284015 | A1 | 10/2017 | Sakaguchi | |

FOREIGN PATENT DOCUMENTS

| | | | | |
|---|---|---|---|---|
| CN | 104562693 | A | 4/2015 | |
| CN | 105378176 | A | 3/2016 | |
| EP | 1 413 670 | A1 | 4/2004 | |
| EP | 2 145 880 | A1 | 1/2010 | |
| JP | 58-13781 | | 1/1983 | |
| JP | 60-65181 | | 4/1985 | |
| JP | 1-314785 | | 12/1989 | |
| JP | 6-102870 | B2 | 12/1994 | |
| JP | 2004204144 | A * | 7/2004 | |
| JP | 2008-274520 | | 11/2008 | |
| JP | 2008-280624 | | 11/2008 | |
| JP | 2014-98134 | | 5/2014 | |
| JP | 2015-71663 | | 4/2015 | |
| JP | 2016-89276 | | 5/2016 | |
| WO | WO 03/010383 | A1 | 2/2003 | |
| WO | WO-2015045618 | A1 * | 4/2015 | .......... D06M 13/224 |
| WO | WO 2016/043043 | A1 | 3/2016 | |
| WO | WO 2018/079763 | A1 | 5/2018 | |

OTHER PUBLICATIONS

Partial machine translation of WO-2015045618-A1 (2020).*
Partial machine translation of JP 2008-280624 A (2020).*
Extended European Search Report dated Sep. 18, 2019, in Patent Application No. 178647863, 7 pages.
Yang, G. et al., "Preparation and mechanical properties of modified epoxy resins with flexible diamines", Polymer, Elsevier Science Publishers B.V, GB, XP005808427, vol. 48, No. 1, Dec. 19, 2006, pp. 302-310.
Japanese Office Action dated Nov. 26, 2019, in Patent Application No. 2018-547814, 9 pages (with unedited computer generated English translation).
International Search Report dated Jan. 30, 2018 in PCT/JP2017/039066 filed Oct. 30, 2017 (with English Translation).
Korean Office Action dated Feb. 20, 2020 in Korean Patent Application No. 10-2019-7010516 (with unedited computer generated English translation), 17 pages.
Combined Chinese Office Action and Search Report dated Jan. 22, 2021 in Chinese Patent Application No. 201780065706.8 (with English translation), 24 pages.
Korean Office Action dated Feb. 22, 2021 in Korean Patent Application No. 10-2019-7010516 (with English translation), 8 pages.
Notice of Final Rejection dated Oct. 21, 2020 in Korean Patent Application No. 10-2019-7010516 (with English machine translation), 8 pages.
Chinese Office Action dated Aug. 16, 2021 in Chinese Patent Application No. 201780065706.8 (with unedited computer generated English translation), 10 pages.
Korean Office Action dated Nov. 26, 2021 in Korean Patent Application No. 10-2019-7010516 (with English translation), 30 pages.
Office Action dated Feb. 21, 2023, in Japanese Paten Application No. 2022-015044, (with English translation), 8 pages.
Office Action dated Aug. 25, 2023, in Japanese Patent Application No. 2022-015044 (with English-language Machine Translation).
Office Action dated Aug. 29, 2023, in Japanese Patent Application No. 2022-015044 (with English-language Machine Translation).

* cited by examiner

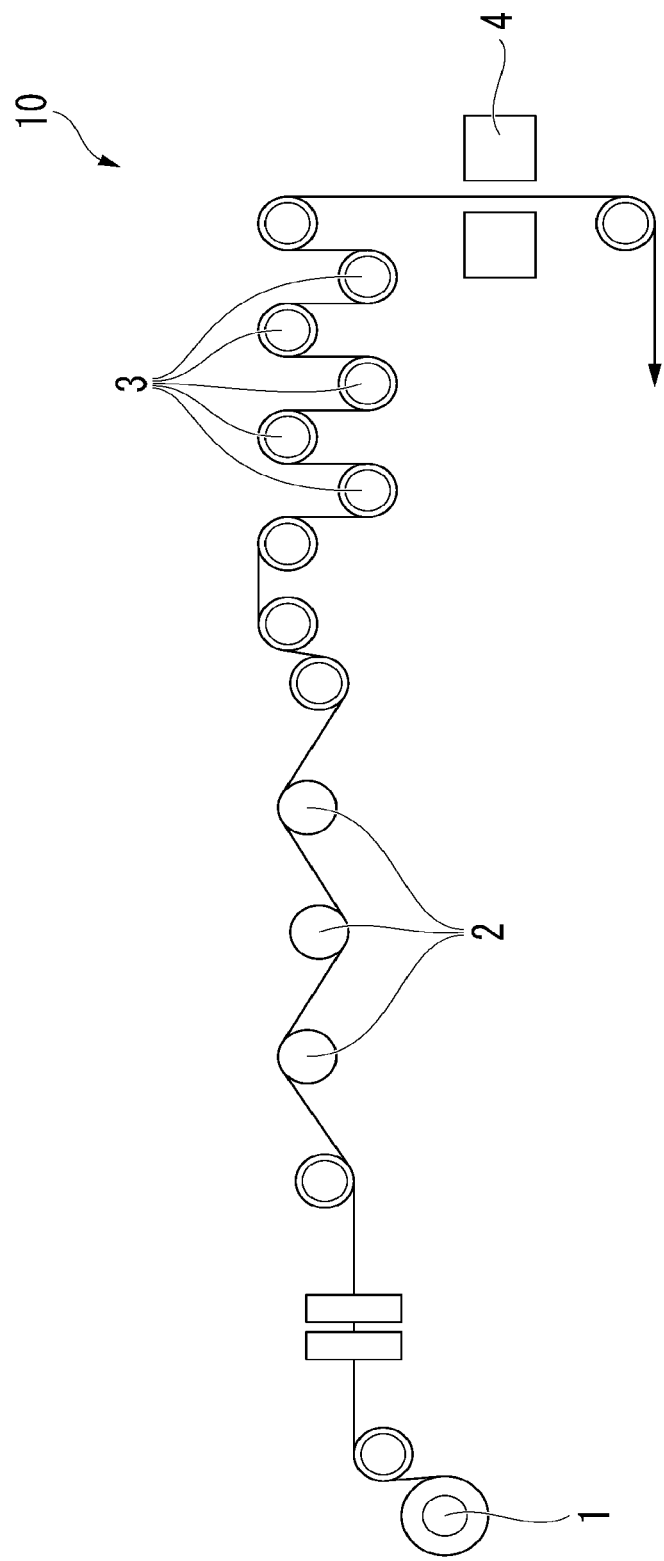

SIZING AGENT FOR CARBON FIBERS, AQUEOUS DISPERSION OF SIZING AGENT FOR CARBON FIBERS, AND SIZING AGENT-ADHERED CARBON FIBER BUNDLE

This application is a continuation application of International Application No. PCT/JP2017/039066, filed on Oct. 30, 2017, which claims the benefit of priority of the prior Japanese Patent Application No. 2016-211672, filed in Japan on Oct. 28, 2016, and the prior Japanese Patent Application No. 2017-200941, filed in Japan on Oct. 17, 2017, the entire contents of which are incorporated herein by reference.

BACKGROUND OF THE INVENTION

Field of the Invention

The present invention relates to a sizing agent for carbon fiber, an aqueous dispersion of the sizing agent for carbon fiber, sizing agent-adhered carbon fibers, and a sizing agent-adhered carbon fiber bundle.

Description of Related Art

One of fiber-reinforced composite materials is a carbon fiber-reinforced resin composite material formed from a reinforcing material composed of carbon fibers, and a matrix resin (hereinafter, may be described as "carbon fiber composite material"). As this matrix resin, various resins such as epoxy resins, unsaturated polyester resins, vinyl ester resins, and phenolic resins are used, and above all, epoxy resins are widely used.

Generally, carbon fibers are used as carbon fiber bundles, in which single fibers having a diameter of about 5 to 8 μm are assembled into a unit of several thousands to several tens of thousands. Therefore, it is not easy to impregnate a carbon fiber bundle with a matrix resin.

There have been occasions in which carbon fibers couldn't sufficiently exhibit their excellent properties as a reinforcing material in case impregnation with a matrix resin is insufficient.

Particularly, in recent years, molding methods with excellent productivity, such as a filament winding (hereinafter, may be abbreviated to "FW") molding method and a pultrusion (hereinafter, may be abbreviated to "PT") molding method, have been applied to carbon fiber composite materials. In regard to these molding methods, it is preferable that carbon fiber bundles are impregnated with a matrix resin in a short time period during processing via a roller, a guide or the like after pulling out the carbon fiber bundles at a high speed from a bobbin around which the carbon fiber bundles were wound.

Conventionally, sizing agents have been applied to carbon fibers for the purpose of enhancing handling in processing and wettability with a matrix resin.

For example, as a sizing agent with which satisfactory impregnation of carbon fiber bundles with a matrix resin is achieved, Patent Document l and Patent Document 2 disclose sizing agents formed from epoxy compounds having different surface free energy values. Furthermore, for the purpose of enhancing friction resistance, Patent Document 3 and Patent Document 4 disclose carbon fiber bundles formed by applying urethane-modified compounds. Furthermore, for the purpose of enhancing the handling of carbon fiber bundles in processing, Patent Document 5 discloses a sizing agent formed from a urethane-modified epoxy resin and a bisphenol A ethylene oxide adduct.

CITATION LIST

Patent Document

Patent Document 1: PCT International Publication No. WO 2003/010383
Patent Document 2: Japanese Unexamined Patent Application, First Publication No. 2008-280624
Patent Document 3: Japanese Unexamined Patent Application, First Publication No. S58-013781
Patent Document 4: Japanese Unexamined Patent Application, First Publication No. H01-314785
Patent Document 5: Japanese Unexamined Patent Application, First Publication No. 2008-274520

SUMMARY OF THE INVENTION

Technical Problem

However, for carbon fiber bundles to which the sizing agents described in Patent Document 1 and Patent Document 2 have been applied, it may be difficult to sufficiently impregnate the carbon fiber bundles with a matrix resin in a high-speed molding method such as filament winding, and the composite materials thus obtained may have insufficient mechanical characteristics. Carbon fiber bundles to which the sizing agents described in Patent Document 3 and Patent Document 4 have been applied have excellent friction resistance, and therefore, the carbon fiber bundles have satisfactory handling in processing; however, impregnation with a matrix resin may be achieved insufficiently. Furthermore, similarly, in the case of carbon fiber bundles that use the sizing agent described in Patent Document 5, the carbon fiber bundles have satisfactory handling in processing; however, it may be difficult to sufficiently impregnate the carbon fiber bundles with a matrix resin in a high-speed molding method such as filament winding.

That is, there is a problem that a sizing agent which can provide carbon fibers and carbon fiber bundles exhibiting satisfactory characteristics in terms of all of impregnation with a resin in processing, handling, and mechanical characteristics of composite materials has not been obtained.

Furthermore, a sizing agent is required to enhance the impregnation of carbon fibers with a matrix resin, particularly the property of carbon fibers to be uniformly dispersed in a matrix resin, as well as to enhance the bundling properties of carbon fibers (rigidity of a bundle of carbon fibers) and the interfacial adhesiveness between carbon fibers and a matrix resin.

An aspect of the invention has been achieved in view of such circumstances as described above, and it is an object of the invention to provide a sizing agent for carbon fibers that can provide carbon fibers and carbon fiber bundles exhibiting satisfactory characteristics in terms of all of the impregnation with a matrix resin, handling in processing, and mechanical characteristics of a composite material, and to provide an aqueous dispersion of the sizing agent. Furthermore, it is an object to provide sizing agent-adhered carbon fibers and a sizing agent-adhered carbon fiber bundle, to which the sizing agent has been applied, and a carbon fiber-reinforced composite material having excellent mechanical characteristics.

Another aspect of the invention has been achieved in view of such circumstances as described above, and it is an object of the invention to provide a sizing agent for carbon fiber that can provide carbon fibers and carbon fiber bundles exhibiting satisfactory characteristics in terms of all of impregnation with a matrix resin, bundling properties, interfacial adhesiveness to a matrix resin, and easy dispersibility in a matrix resin, and to provide an aqueous dispersion of the sizing agent for carbon fiber.

Furthermore, it is an object to provide sizing agent-adhered carbon fibers and a sizing agent-adhered carbon fiber bundle, to which the above-described sizing agent for carbon fiber has been applied.

The present invention includes the following embodiments.

[1] A sizing agent for carbon fiber, the sizing agent comprising a component (A), a component (B), and a component (C), wherein the component (A) is at least one selected from the group consisting of component (A-1), component (A-2), and component (A-3), the component (A-1) is a urethane compound having a structure of the following Formula (1-1) in the molecule:

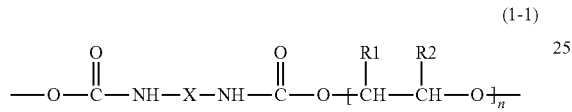

(1-1)

in the formula, X represents a divalent aromatic group, a divalent linear or branched aliphatic hydrocarbon group, or a divalent alicyclic hydrocarbon group; R1 and R2 each independently represent a methyl group or a hydrogen atom; and n represents an integer from 1 to 50, the component (A-2) is an ester compound having a structure represented by the following Formula (1-2) in the molecule:

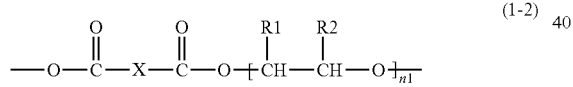

(1-2)

in the formula, X represents a divalent aromatic group, a divalent linear or branched aliphatic hydrocarbon group, or a divalent alicyclic hydrocarbon group; R1 and R2 each independently represent a methyl group or a hydrogen atom; and n1 represents an integer from 1 to 50, the component (A-3) is an amide compound having a structure of the following Formula (1-3) in the molecule:

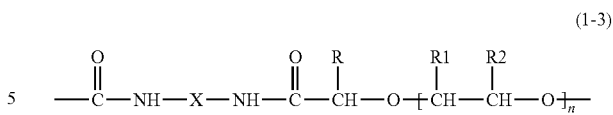

(1-3)

in the formula, X represents a divalent aromatic group, a divalent linear or branched aliphatic hydrocarbon group, or a divalent alicyclic hydrocarbon group; R, R1, and R2 each independently represent a methyl group or a hydrogen atom; and n represents an integer from 1 to 49, the component (B) is an epoxy compound selected from the group consisting of an epoxy compound represented by the following Formula (2), an epoxy compound represented by the following Formula (3), and an epoxy compound represented by the following Formula (4):

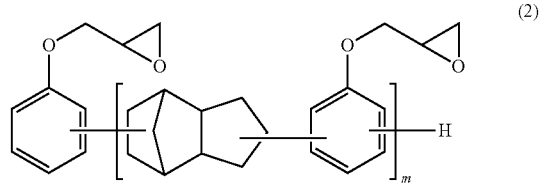

(2)

in the formula, m represents an integer from 1 to 5,

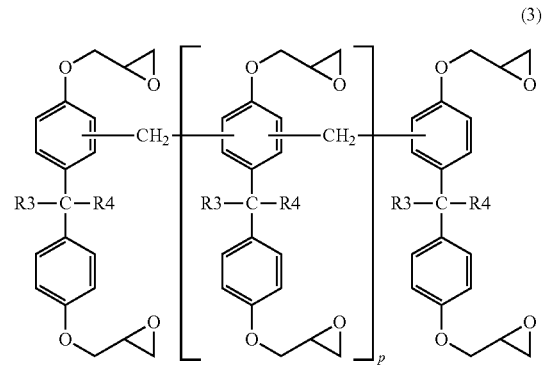

(3)

in the formula, R3 and R4 each independently represent a hydrogen atom or a saturated aliphatic hydrocarbon group having 1 to 4 carbon atoms; and p represents an integer from 0 to 5,

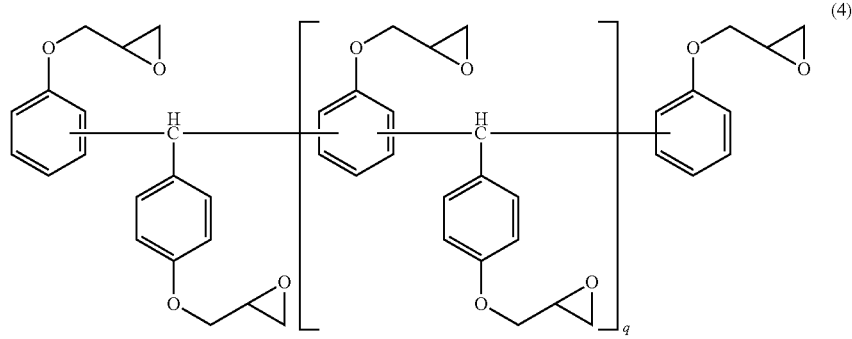

(4)

in the formula, q represents an integer from 0 to 5, and the component (C) is a bisphenol type epoxy compound or an aliphatic epoxy compound.

[2] The sizing agent for carbon fiber according to [1], wherein the component (A) includes component (A-1), and the component (A-1) has an epoxy group in the molecule.

[3] The sizing agent for carbon fiber according to [1] or [2], wherein the component (A) includes the component (A-1); the content of the component (A-1) is 10 to 60 parts by mass, the content of the component (B) is 15 to 55 parts by mass, and the content of the component (C) is 20 to 75 parts by mass, with respect to 100 parts by mass of the sum of the component (A), the component (B), and the component (C); and the sum of the component (A-1), the component (B), and the component (C) is 50% by mass or more with respect to the total mass of the sizing agent for carbon fiber.

[4] The sizing agent for carbon fiber according to [3], wherein the sizing agent further includes an aliphatic ester compound, and the content of the aliphatic ester compound is 5% to 20% by mass with respect to the total mass of the sizing agent for carbon fiber.

[5] The sizing agent for carbon fiber according to [3] or [4], in which the sizing agent further includes a surfactant, and the content of the surfactant is 10% to 25% by mass with respect to the total mass of the sizing agent for carbon fiber.

[6] The sizing agent for carbon fiber according to [5], in which the surfactant is an anionic surfactant represented by the following Formula (5):

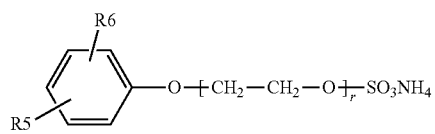

(5)

in the formula, R5 and R6 each independently represent a hydrogen atom, an aliphatic hydrocarbon group having 1 to 18 carbon atoms, or an aromatic hydrocarbon group having 6 to 20 carbon atoms; and r represents an integer from 5 to 25.

[7] The sizing agent for carbon fiber according to [1], in which the component (A) includes the component (A-2), and the component (A-2) has an epoxy group in the molecule.

[8] The sizing agent for carbon fiber according to [1] or [7], in which the component (A) includes the component (A-2), and the component (A-2) has a structure represented by the following Formula (1-2)' in the molecule:

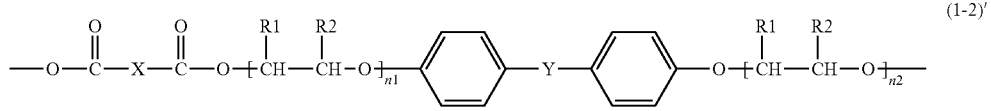

(1-2)' in the formula, X represents a divalent aromatic group, a divalent linear or branched aliphatic hydrocarbon group, or a divalent alicyclic hydrocarbon group; Y represents a methylene group, a 1,1-ethylene group, a 2,2-propylene group, $-SO_2-$, an oxygen atom, a sulfur atom, or a single bond; R1 and R2 each independently represent a methyl group or a hydrogen atom; and n1 and n2 each independently represent an integer from 1 to 50.

[9] The sizing agent for carbon fiber according to any one of [1], [7], and [8], in which the component (A) includes the component (A-2); and the component (A-2) is 40 to 80 parts by mass, the content of the component (B) is 10 to 40 parts by mass, and the content of the component (C) is 10 to 30 parts by mass, with respect to 100 parts by mass of the sum of the contents of the component (A), the component (B), and the component (C).

[10] The sizing agent for carbon fiber according to [9], in which the sizing agent further comprises a surfactant, and the content of the surfactant is 5% to 30% by mass with respect to the total mass of the sizing agent for carbon fiber.

[11] The sizing agent for carbon fiber according to [10], wherein the surfactant is a nonionic surfactant.

[12] An aqueous dispersion of a sizing agent for carbon fiber, the aqueous dispersion includes the sizing agent for carbon fiber according to any one of [1] to [11] and water, wherein the sizing agent for carbon fiber is dispersed in water.

[13] A sizing agent-adhered carbon fiber bundle comprising carbon fibers and a sizing agent for carbon fiber, wherein a spontaneous dispersion ratio measured by the spontaneous dispersibility test is 3 or higher.

[14] The sizing agent-adhered carbon fiber bundle according to [13], wherein the carbon fiber bundle includes the sizing agent for carbon fiber according to any one of [1] to [11] at a proportion of 0.1% to 5.0% by mass with respect to the total mass of the sizing agent-adhered carbon fiber bundle.

[15] A method for producing a carbon fiber-reinforced composite material, the method comprising:
impregnating the sizing agent-adhered carbon fiber bundle according to [13] or [14] with a thermosetting resin composition, and heating and curing the thermosetting resin composition.

[16] A method for producing a carbon fiber-reinforced pressure vessel, the method comprising:
impregnating the sizing agent-adhered carbon fiber bundle according to [13] or [14] with a thermosetting resin composition, heating and curing the thermosetting resin composition by a filament winding method, and producing a carbon fiber-reinforced pressure vessel.

According to an aspect of the invention, sizing agent-adhered carbon fibers and a sizing agent-adhered carbon fiber bundle exhibiting satisfactory characteristics in terms of all of the impregnation with a matrix resin, handling in processing, and the mechanical characteristics of the composite material can be obtained by using a sizing agent for carbon fiber.

According to another aspect of the invention, sizing agent-adhered carbon fibers and a sizing agent-adhered carbon fiber bundle exhibiting satisfactory characteristics in terms of all of the impregnability with a matrix resin, bundling properties, interfacial adhesiveness to a matrix resin, and easy dispersibility in a matrix resin can be obtained by using a sizing agent for carbon fiber.

BRIEF DESCRIPTION OF THE DRAWINGS

FIG. 1 is a schematic diagram of an apparatus for measuring a fiber spread ratio A.

DETAILED DESCRIPTION OF THE INVENTION

<<Sizing Agent for Carbon Fiber>>
<Component (A)>

In the present invention, component (A) is at least one selected from the group consisting of a component (A-1), a component (A-2), and a component (A-3).

Component (A-1) that is used in the sizing agent for carbon fiber of the invention is a urethane compound having a structure of Formula (1-1) in the molecule. It is preferable that component (A-1) has at least two or more epoxy groups in one molecule.

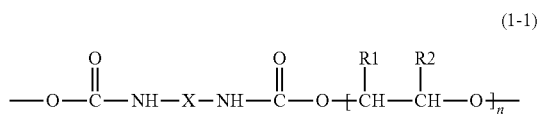

(1-1)

(In the formula, X represents a divalent aromatic group, a divalent linear or branched aliphatic hydrocarbon group, or a divalent alicyclic hydrocarbon group; R1 and R2 each independently represent a methyl group or a hydrogen atom; and n represents an integer from 1 to 50. It is preferable for R1 and R2 that any one of them is a methyl group, while the other is a hydrogen atom.)

Component (A-1) can be obtained by causing a mixture of polyhydroxy compounds (polyol mixture) including a polyhydroxy compound having a hydroxyethyloxy group, a hydroxypoly(ethyleneoxy) group, a hydroxyisopropyloxy group, or a hydroxypoly(isopropyloxy) group (hereinafter, described as polyhydroxy compound A) to react with a diisocyanate compound.

As polyhydroxy compound A, it is preferable to use a polyhydroxy compound having a hydroxyisopropyloxy group or a hydroxypoly(isopropyloxy) group.

Component (A-1) having an epoxy group in the molecule can be obtained by causing a urethane compound having a structure represented by Formula (1-1)' to react with an epoxy compound having a hydroxy group.

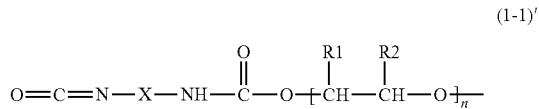

(1-1)'

(In the formula, X represents a divalent aromatic group, a divalent linear or branched aliphatic hydrocarbon group, or a divalent alicyclic hydrocarbon group; R1 and R2 each independently represent a methyl group or a hydrogen atom; and n represents an integer from 1 to 50. It is preferable for R1 and R2 that any one of them is a methyl group, while the other is a hydrogen atom.)

A urethane compound having a structure represented by Formula (1-1)' in the molecule is obtained by mixing a mixture of polyhydroxy compounds (polyol mixture) including polyhydroxy compound A with a diisocyanate compound such that the amount of isocyanate groups in the diisocyanate compound is in an excess amount with respect to 1 mol of hydroxy groups in the polyol mixture, and causing the mixture to react at 40° C. to 140° C.

As the polyhydroxy compound A, it is preferable to use a polyhydroxy compound having a hydroxyisopropyloxy group or a hydroxypoly(isopropyloxy) group.

In case a mixture of polyhydroxy compounds (polyol mixture) including polyhydroxy compound A is reacted with a diisocyanate compound, it is also possible to use a catalyst for urethane polymerization in order to accelerate the reaction, for example, organometallic compounds such as dioctyltin dilaurate, dibutyltin dilaurate, tin(II) octoate, stannous octoate, lead octoate, lead naphthenate, and zinc octoate; and tertiary amine-based compounds such as triethylenediamine and triethylamine.

Examples of the polyhydroxy compound other than polyhydroxy compound A include a polyester polyol, a polycarbonate polyol, a polyester amide polyol, an acrylic polyol, and a polyurethane polyol, and among these, a polyether polyol can be preferably used. The polyhydroxy compounds may be used singly, and a plurality of those compounds may be used in combination.

Regarding the polyhydroxy compound having a hydroxyisopropyleneoxy group or a hydroxypoly(isopropyloxy) group, a compound obtained by adding propylene oxide to a polyhydric alcohol so as to obtain a desired molecular weight (molecular weight 100 to 10,000) is preferably used.

Examples of the polyhydric alcohol include, as dihydric alcohols, ethylene glycol, propylene glycol, and 1,4-butylene glycol; as trihydric alcohols, glycerin, trioxyisobutane (2-hydroxymethylpropane-2,3-diol), 1,2,3-butanetriol, 1,2,3-pentanetriol, 2-methyl-1,2,3-propanetriol, 2-methyl-2,3,4-butanetriol, 2-ethyl-1,2,3-butanetriol, 1,2,4-butanetriol, 2,3,4-pentanetriol, 2,3,4-hexanetriol, pentamethylglycerin, and 1,2,4-pentanetriol; as tetrahydric alcohols, erythritol, 1,2,3,4-pentanetetraol, 2,3,4,5-hexatetraol, 1,2,3,5-pentanetetraol, and 1,3,4,5-hexanetetraol; as pentahydric alcohols, xylytol and arabitol; and as hexahydric alcohols, sorbitol and mannitol. Among these, preferred as the polyhydric alcohol are dihydric to tetrahydric alcohols.

Examples of the diisocyanate compound include propane-1,2-diisocyanate, 2,3-dimethylbutane-2,3-diisocyanate, 2-methylpentane-2,4-diisocyanate, octane-3,6-diisocyanate, 3,3-dinitropentane-1,5-diisocyanate, octane-1,6-diisocyanate, 1,6-hexamethylene diisocyanate (HDI), trimethylhexamethylene diisocyanate, lysine diisocyanate, tolylene diisocyanate (TDI), xylylene diisocyanate, metatetramethylxylylene diisocyanate, isophorone diisocyanate (3-isocynatomethyl-3,5,5-trimethylcyclohexyl isocyanate), 1,3—or 1,4-bis(isocyanatomethyl)cyclohexane, diphenylmethane-4,4'-diisocyanate (MDI), dicyclohexylmethane-4,4'-diisocyanate (hydrogenated MDI), hydrogenated tolylene diisocyanate, and mixtures thereof.

Furthermore, cases in which X in Formula (1-1) is a divalent aromatic group and cases in which the diisocyanate is an aromatic diisocyanate such as tolylene diisocyanate (TDI) and xylylene diisocyanate are preferable because the interaction of the sizing agent for carbon fiber of the invention with the carbon fiber surface is intensified, and the sizing agent has excellent compatibility with a matrix resin having aromatic rings and having excellent heat resistance.

Furthermore, the diisocyanates may be used singly, and a plurality of diisocyanates may be used in combination. In addition, polyisocyanates each having three or more isocyanate groups in one molecule, such as a triisocyanate and a tetraisocyanate, may be used in combination.

Examples of the epoxy compound having a hydroxy group include compounds having hydroxy groups among epoxy resins such as a bisphenol A type epoxy resin, a bisphenol F type epoxy resin, a biphenyl type epoxy resin, a resorcinol type epoxy resin, a bisphenol S type epoxy resin, a polyethylene glycol type epoxy resin, which is a reaction product between a polyhydric alcohol and halogen-containing epoxides, and a polypropylene glycol type epoxy resin. Among these, from the viewpoint of enhancing the compatibility with a matrix resin, a bisphenol A type epoxy resin or a bisphenol F type epoxy resin, both having hydroxy groups, is preferably used.

The component (A-1) having an epoxy group in the molecule is obtained by, for example, mixing a urethane compound having an isocyanate residue and having a structure represented by Formula (1-1)' in the molecule with an epoxy compound having a hydroxy group, and causing the mixture to react at 40° C. to 140° C. At this time, the amount of hydroxy groups in the epoxy compound having a hydroxy group is adjusted to be 1 to 10 mol with respect to 1 mol of isocyanate residues in the urethane compound having a structure represented by Formula (1-1)' in the molecule.

Furthermore, in that case, it is also possible to use a catalyst for urethane polymerization for accelerating the reaction, for example, an organometallic compound such as dioctyltin dilaurate, dibutyltin dilaurate, tin(II) octoate, stannous octoate, lead octoate, lead naphthenate, or zinc octoate; or a tertiary amine-based compound such as triethylenediamine or triethylamine.

Component (A-1) is a compound that has a urethane bond in the molecule, has a strong interaction with the carbon fiber surface, and has flexibility. In a process of impregnating a carbon fiber bundle with a matrix resin and curing the matrix resin, as component (A-1) is included in the sizing agent that has adhered to the surface of single fibers of carbon fiber, it is possible to form a flexible interface layer strongly adhered to the surface of single fibers of carbon fiber. As a result, in a case in which carbon fibers to which a sizing agent including component (A) is adhered are used as reinforcing fibers for a composite material, the composite material has satisfactory mechanical characteristics and performance.

Component (A-1) having an epoxy group in the molecule is a compound that has an epoxy group and a urethane bond in the molecule, has a strong interaction with the carbon fiber surface, and has flexibility. In a process of impregnating a carbon fiber bundle with a matrix resin and curing the matrix resin, as component (A-1) having an epoxy group in the molecule is included in the sizing agent that has adhered to the surface of single fibers of carbon fiber, a flexible interface layer strongly adhered to the surface of single fibers of carbon fiber can be formed. As a result, in a case in which carbon fibers to which a sizing agent including component (A) is adhered are used as reinforcing fibers of a composite material, the composite material has particularly satisfactory mechanical characteristics and performance.

As raw materials for a sizing agent including component (A-1), commercially available products such as ADEKA RESIN EPU-73B (manufactured by Adeka Corporation) and ADEKA RESIN EPU-78-11 (manufactured by Adeka Corporation) can be used; however, many of these commercially available products include bisphenol type epoxy resins that do not have a structure of Formula (1-1) in the molecule, such as a bisphenol A type epoxy resin and a bisphenol F type epoxy resin. According to the invention, a bisphenol type epoxy resin that does not have a structure of Formula (1-1) in the molecule corresponds to component (C), which will be described below.

Component (A-1) that is included in ADEKA RESIN EPU-73B and ADEKA RESIN EPU-78-11 has an epoxy group in the molecule.

Component (A-2) is an ester compound having a structure of the following Formula (1-2) in the molecule.

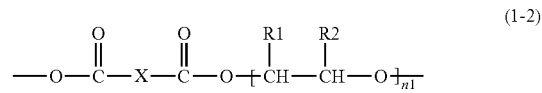

(In the formula, X represents a divalent aromatic group, a divalent linear or branched aliphatic hydrocarbon group, or a divalent alicyclic hydrocarbon group; R1 and R2 each independently represent a methyl group or a hydrogen atom; and n1 represents an integer from 1 to 50.)

Component (A-2) may has a carboxy group or an alcoholic hydroxy group on the terminal of its main chain.

Component (A-2) can be obtained by mixing a mixture of polyhydroxy compounds (polyol mixture) including polyhydroxy compound A with a dicarboxy compound or a carboxylic acid anhydride (hereinafter, may be simply described as acid anhydride) and causing the mixture to react.

It is preferable that component (A-2) has a structure represented by Formula (1-2)' in the molecule.

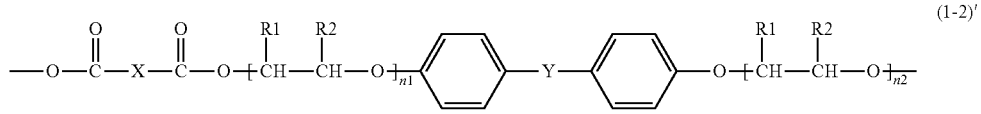

(In the formula, X represents a divalent aromatic group, a divalent linear or branched aliphatic hydrocarbon group, or a divalent alicyclic hydrocarbon group; Y represents a methylene group, a 1,1-ethylene group, a 2,2-propylene group, —$SO_2$—, an oxygen atom, a sulfur atom, or a single bond; R1 and R2 each independently represent a methyl group or a hydrogen atom; and n1 and n2 each independently represent an integer from 1 to 50.)

Component (A-2) may have an epoxy group in the molecule. Component (A-2) having an epoxy group can be obtained by causing component (A-2') having a structure represented by the following Formula (1-2)'' to react with an epoxy compound having two or more epoxy groups in one molecule.

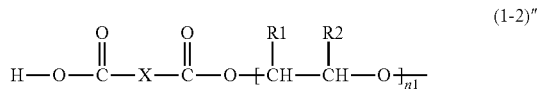

(1-2)″

(In the formula, X represents a divalent aromatic group, a divalent linear or branched aliphatic hydrocarbon group, or a divalent alicyclic hydrocarbon group; R1 and R2 each independently represent a methyl group or a hydrogen atom; and n1 represents an integer from 1 to 50.)

Component (A-2') having a structure represented by Formula (1-2)″ in the molecule (that is, component (A-2) in which the terminal of the main chain is a carboxy group) can be obtained by making a mixture of polyhydroxy compounds (polyol compound) including polyhydroxy compound A with a dicarboxy compound or a carboxylic acid anhydride (hereinafter, may be simply described as acid anhydride), such that carboxylic acid in the dicarboxy compound or the acid anhydride is in an excess amount with respect to hydroxy groups in the polyol mixture, and causing the mixture to react.

Component (A-2) in which the terminal of the main chain is an alcoholic hydroxy group can be obtained by making a mixture of a polyol mixture and a dicarboxy compound or an acid anhydride, such that the carboxylic acid in the dicarboxy compound or the acid anhydride is insufficient with respect to hydroxy groups in the polyol mixture, and causing the mixture to react.

Regarding the polyhydroxy compound other than polyhydroxy compound A, a hydroxy group-terminated polyester polyol, a polycarbonate polyol, a polyester amide polyol, an acrylic polyol, a polyurethane polyol, or a polyether polyol can be used.

The polyhydroxy compounds may be used singly, and a plurality of the compounds may be used in combination.

As the polyhydroxy compound A, a compound obtained by adding ethylene oxide or propylene oxide to a bisphenol so as to obtain a desired molecular weight (mass average molecular weight 100 to 10,000) is preferably used, and component (A-2) having a structure represented by Formula (1-2)' in the molecule can be obtained.

Meanwhile, the mass average molecular weight in the invention is a value calculated relative to polystyrene standards based on measurement by gel permeation chromatography.

Examples of the bisphenol include bisphenol F, bisphenol E, bisphenol A, bisphenol S, 4,4'-oxydiphenol, 4,4'-thiodiphenol, and 4,4'-biphenol. A phenylene group of the bisphenol may have a substituent. Examples of a bisphenol having a phenylene group having a substituent include various bisxylenols and bis-ortho-cresols. Among these, bisphenol F and bisphenol A are preferred, and bisphenol A is more preferred.

Regarding the polyhydroxy compound A, a compound obtained by adding ethylene oxide or propylene oxide to a polyhydric alcohol so as to obtain a desired molecular weight (mass average molecular weight 100 to 10,000) is also preferably used.

Examples of the polyhydric alcohol include, as dihydric alcohols, ethylene glycol, propylene glycol, 1,4-butylene glycol, and 1,4-dihydroxymethylbenzene; as trihydric alcohols, glycerin, trioxyisobutane (2-hydroxymethylpropane-2,3-diol), 1,2,3-butanetriol, 1,2,3-pentanetriol, 2-methyl-1,2,3-propanetriol, 2-methyl-2,3,4-butanetriol, 2-ethyl-1,2,3-butanetriol, 1,2,4-butanetriol, 2,3,4-pentanetriol, 2,3,4-hexanetriol, pentamethylglycerin, and 1,2,4-pentanetriol; as tetrahydric alcohols, erythritol, 1,2,3,4-pentanetetraol, 2,3,4,5-hexatetraol, 1,2,3,5-pentanetetraol, and 1,3,4,5-hexanetetraol; as pentahydric alcohols, xylytol and arabitol; and as hexahydric alcohols, sorbitol and mannitol. Among these, preferred as the above-described polyhydric alcohol are dihydric to tetrahydric alcohols.

Examples of the dicarboxy compound include terephthalic acid, isophthalic acid, and mixtures of these. Examples of the acid anhydride include phthalic anhydride. These dicarboxylic acids and acid anhydrides may have a substituent such as a methyl group or an ethyl group.

Furthermore, cases in which X in Formula (1-2) is a divalent aromatic group, that is, cases in which the dicarboxy compound is an aromatic dicarboxy compound such as terephthalic acid or isophthalic acid are preferable because the interaction of the sizing agent for carbon fiber of the invention with the carbon fiber surface is intensified, and the sizing agent has excellent compatibility with a matrix resin having aromatic rings and having excellent heat resistance.

Furthermore, the dicarboxy compounds may be used singly, and a plurality of dicarboxy compounds may be used in combination. In addition, a polycarboxylic acid having three or more carboxy groups in one molecule may be used in combination.

Examples of the epoxy compound having two or more epoxy groups in one molecule include epoxy resins such as a bisphenol A type epoxy resin, a bisphenol F type epoxy resin, a biphenyl type epoxy resin, a resorcinol type epoxy resin, a bisphenol S type epoxy resin, a polyol type epoxy resin, which is a reaction product between a polyhydric alcohol and halogen-containing epoxides, a polyethylene glycol type epoxy resin, and a polypropylene glycol type epoxy resin. Among these, from the viewpoint of enhancing the compatibility with a matrix resin, a bisphenol A type epoxy resin or a bisphenol F type epoxy resin is preferably used.

Component (A-3) that is used in the sizing agent for carbon fiber of the invention is an amide compound having a structure of Formula (1-3) in the molecule.

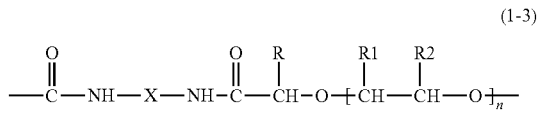

(1-3)

(In the formula, X represents a divalent aromatic group, a divalent linear or branched aliphatic hydrocarbon group, or a divalent alicyclic hydrocarbon group; R, R1, and R2 each independently represent a methyl group or a hydrogen atom; and n represents an integer from 1 to 49.)

Component (A-3) can be obtained by causing carboxylic acids, which can be obtained by oxidizing a hydroxymethyl groups at the molecular terminals of a mixture of polyhydroxy compounds (polyol mixture) including polyhydroxy compound A into a carboxy group, to react with a diamino compound.

Examples of the diamino compound include propane-1,2-diamine, 2,3-dimethylbutane-2,3-diamine, 2-methylpentane-2,4-diamine, octane-3,6-diamine, 3,3-dinitropentane-1,5-diamine, octane-1,6-diamine, 1,6-hexamethylenediamine, trimethylhexamethylenedi amine, lysinediamine, tolylenediamine, xylylenediamine, metatetramethylxylylenediamine, isophoronediamine (3-aminomethyl-3,5,5-trimethylcyclohexylamine), 1,3— or 1,4-bis(aminomethyl)

cyclohexane, diphenylmethane-4,4'-diamine, dicyclohexylmethane-4,4'-diamine, hydrogenated tolylenediamine, and mixtures of these.

<Component (B)>

Component (B) is an epoxy compound selected from the group consisting of an epoxy compound represented by the following Formula (2), an epoxy compound represented by the following Formula (3), and an epoxy compound represented by the following Formula (4):

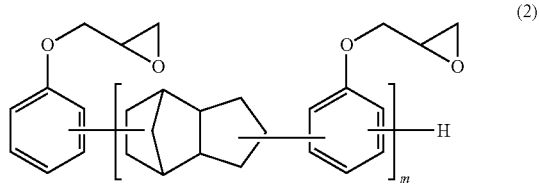

(2)

(In the formula, m represents an integer from 1 to 5.)

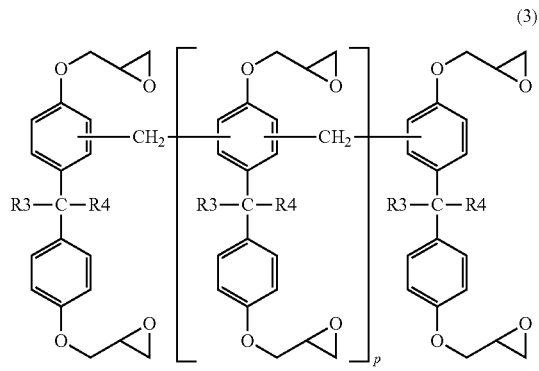

(3)

(In the formula, R3 and R4 each independently represent a hydrogen atom or a saturated aliphatic hydrocarbon group having 1 to 4 carbon atoms; and p represents an integer from 0 to 5.)

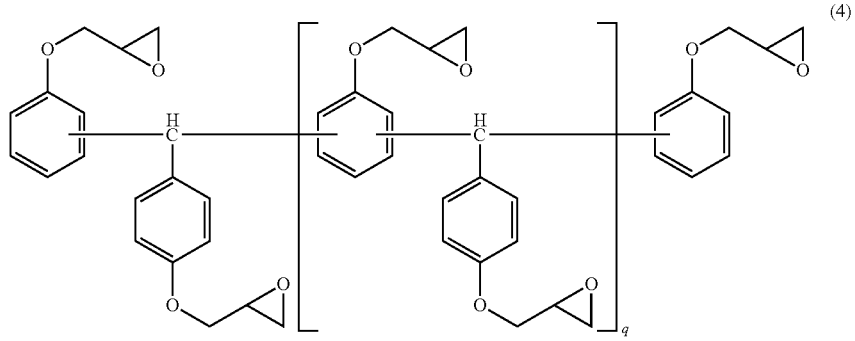

(4)

(In the formula, q represents an integer from 0 to 5.)

Component (B) may be an epoxy compound selected from the group consisting of an epoxy compound represented by the above-described Formula (2), an epoxy compound represented by the above-described Formula (3), and an epoxy compound represented by the above-described Formula (4). One kind of compound may be used, and a plurality of compounds may be used as a mixture.

Generally, an industrially available epoxy resin is a mixture of compounds in which m, p, and q in the above-described Formulae (2), (3), and (4) are integers different from one another, and the mixture may be expressed by indicating a number having a decimal separator in the places for m, p, and q in the above-described Formulae (2), (3), and (4).

Examples of component (B) will be mentioned below; however, the examples are not limited to these.

As the epoxy compound represented by Formula (2) of component (B), commercially available products such as EPICLON HP7200 series (manufactured by DIC Corporation) can be used.

As the epoxy compound represented by Formula (3) of component (B), commercially available products such as jER157S70 (manufactured by Mitsubishi Chemical Corporation) and jER157S60 (manufactured by Mitsubishi Chemical Corporation) can be used.

As the epoxy compound represented by Formula (4) of component (B), commercially available products such as jER1032H60 (manufactured by Mitsubishi Chemical Corporation) and jER1032S50 (manufactured by Mitsubishi Chemical Corporation) can be used.

Examples of the bisphenol type epoxy compound or aliphatic epoxy compound of component (C) include bisphenol type epoxy resins such as a bisphenol A type epoxy resin and a bisphenol F type epoxy resin, or a glycidyl ether-terminated epoxy resin which can be formed through a reaction between an aliphatic alcohol or a polyol and epichlorohydrin. Furthermore, a compound having an epoxy equivalent of 160 to 400 g/eq, a number average molecular weight of 340 to 800, or a viscosity at 50° C. of from 100 mPa·s to 10,000 mPa·s is preferred.

The viscosity can be measured according to "Method for measuring viscosity using cone-plate type rotary viscometer" of JIS Z8803 (2011).

Regarding component (C), a bisphenol type epoxy compound is preferred, and a bisphenol A type epoxy resin or a bisphenol F type resin is more preferred because the resin is useful for general purposes.

Regarding the aliphatic epoxy compound, commercially available products such as EPIOL G-100 (manufactured by NOF Corporation) as glycerin triglycidyl ether, and DENACOL EX-612, EX-614, and EX-622 (manufactured by Nagase ChemteX Corporation) as sorbitol polyglycidyl ethers, can be used.

According to an embodiment of the invention, the content of component (A) is preferably from 10 parts by mass to 60 parts by mass with respect to 100 parts by mass of the sum of component (A), component (B), and component (C).

When the content of component (A) included in 100 parts by mass of the sum of component (A), component (B), and component (C) is 10 parts by mass or more, impregnation of the carbon fiber bundle of the invention with a matrix resin is achieved satisfactorily, and in a case in which the carbon fiber bundle is used as a reinforcing fiber of a composite material, a carbon fiber bundle that provides a composite material having satisfactory mechanical characteristics is obtained. When the content is 60 parts by mass or less, satisfactory handling of the carbon fiber bundle in processing such as FW molding is obtained. The content is even more preferably from 15 parts by mass to 40 parts by mass.

According to another embodiment of the invention, the content of component (A) is preferably from 10 parts by mass to 90 parts by mass with respect to 100 parts by mass of the sum of component (A), component (B), and component (C).

When the content of component (A) is 10 parts by mass or more, impregnation of the sizing agent-adhered carbon fiber bundle with a matrix resin is achieved satisfactorily, and in a case in which the sizing agent-adhered carbon fiber bundle is used as a reinforcing fiber of a composite material, a sizing agent-adhered carbon fiber bundle that provides a composite material having satisfactory mechanical characteristics is obtained.

When the content of component (A) is 90 parts by mass or less, satisfactory handling of the carbon fiber bundle in processing such as FW molding is obtained.

The content of component (A) is even more preferably from 40 parts by mass to 80 parts by mass.

According to an embodiment of the invention, the content of component (B) is preferably from 15 parts by mass to 55 parts by mass with respect to 100 parts by mass of the sum of component (A), component (B), and component (C).

When the content of component (B) included in 100 parts by mass of the sum of component (A), component (B), and component (C) is 15 parts by mass or more, satisfactory handling of the carbon fiber bundle of the invention in processing such as FW molding is obtained. When the content is 55 parts by mass or less, impregnation of the carbon fiber bundle with a matrix resin is achieved satisfactorily. The content is even more preferably from 20 parts by mass to 45 parts by mass.

According to another aspect of the invention, the content of component (B) is preferably from 2 parts by mass to 70 parts by mass with respect to 100 parts by mass of the sum of component (A), component (B), and component (C).

When the content of component (B) is 2 parts by mass or more, the carbon fiber bundle of the invention has satisfactory handling in processing such as FW molding.

When the content of component (B) is 70 parts by mass or less, impregnation of the sizing agent-adhered carbon fiber bundle with a matrix resin is achieved satisfactorily.

The content of component (B) is even more preferably from 10 parts by mass to 40 parts by mass.

According to an embodiment of the invention, the content of component (C) is preferably from 20 parts by mass to 75 parts by mass with respect to 100 parts by mass of the sum of component (A), component (B), and component (C).

When the content of component (C) included in 100 parts by mass of the sum of component (A), component (B), and component (C) is 20 parts by mass or more, impregnation of the carbon fiber bundle of the invention with a matrix resin is achieved satisfactorily, and when the content is 75 parts by mass or less, satisfactory handling of the carbon fiber bundle in processing such as FW molding is obtained. The content is even more preferably from 40 parts by mass to 60 parts by mass.

According to another embodiment of the invention, the content of component (C) is preferably from 2 parts by mass to 70 parts by mass with respect to 100 parts by mass of the sum of component (A), component (B), and component (C).

When the content of component (C) is 2 parts by mass or more, impregnation of the sizing agent-adhered carbon fiber bundle of the invention with a matrix resin is achieved satisfactorily.

When the content of component (C) is 70 parts by mass or less, satisfactory handling of the carbon fiber bundle in processing such as FW molding is obtained.

The content of component (C) is even more preferably from 10 parts by mass to 30 parts by mass.

The sizing agent for carbon fiber of the invention may include an aliphatic ester as component (D) in addition to component (A), component (B), and component (C).

The content of component (D) is preferably from 5% by mass to 20% by mass with respect to the total mass of the sizing agent for carbon fiber.

By including component (D), handling of the sizing agent-adhered carbon fiber bundle in processing can be further improved.

Component (D) is not particularly limited as long as it is an aliphatic carboxylic acid ester; however, an aliphatic ester obtainable by subjecting an aliphatic monocarboxylic acid having from 8 to 21 carbon atoms and an aliphatic alcohol to dehydration condensation is preferred. Specific examples include EXCEPARL series (Kao Corporation). More specific examples include EXCEPARL EH-S and EXCEPARL SS (all product names of Kao Corporation).

The sizing agent of the invention may further include a surfactant such as a nonionic surfactant or an anionic surfactant as component (E).

Component (E) that is included in the sizing agent for carbon fiber of the invention is used to disperse the above-mentioned component (A), component (B), component (C), as well as component (D) as an optional component, and other components into water. The surfactants may be used singly, or two or more kinds thereof may be used in combination.

In order to apply the sizing agent for carbon fiber to carbon fibers, the sizing agent for carbon fiber can be used in a state of being dispersed in water or an organic solvent having low ability to dissolve, or the sizing agent can also be used in a state of being dissolved in an organic solvent having high ability to dissolve.

Using the sizing agent for carbon fiber in a state of being dispersed in water is easier compared to using the sizing agent in a state of being dissolved in an organic solvent, and is superior.

Examples of an organic solvent having low ability to dissolve include ethanol.

Examples of an organic solvent having high ability to dissolve include acetone.

The content of component (E) can be determined as appropriate in consideration of the stability of an aqueous dispersion in which the sizing agent for carbon fiber is dispersed in water.

The content of component (E) is preferably 5% to 30% by mass, and more preferably 10% to 25% by mass, with respect to the total mass of the sizing agent for carbon fiber.

When the content is 5% by mass or more, satisfactory stability of the aqueous dispersion of the sizing agent is obtained, and when the content is 30% by mass or less, the effect of the sizing agent is exhibited satisfactorily.

Examples of the nonionic surfactant include, as aliphatic nonionic surfactants, a higher alcohol ethylene oxide adduct, a fatty acid ethylene oxide adduct, a polyhydric alcohol fatty acid ester ethylene oxide adduct, a fatty acid ester of glycerol, fatty acid esters of sorbitol and sorbitan, and a fatty acid ester of pentaerythritol. Furthermore, the examples include, as phenol-based nonionic surfactants, an alkylphenol-based nonion and a polycyclic phenol-based nonion. Furthermore, a block copolymer of ethylene oxide and propylene oxide (so-called pluronic type) is suitably used.

Regarding the anionic surfactant, a compound that has ammonium ion as a counter ion and has an alkylene oxide-added phenolic group as a hydrophobic group is preferred.

As the anionic surfactant, surfactants such as a carboxylic acid salt, a sulfuric acid ester salt, a sulfonic acid salt, and a phosphoric acid ester salt can be used. Among them, a sulfuric acid ester salt is preferred.

As the anionic surfactant, a compound having a structure represented by the following Formula (5) is suitably used.

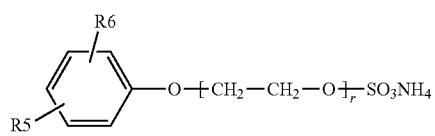

(5)

(In the formula, R5 and R6 each independently represent a hydrogen atom, an aliphatic hydrocarbon group having 1 to 18 carbon atoms, or an aromatic hydrocarbon group having 6 to 20 carbon atoms; and r represents an integer from 5 to 25.)

<<Aqueous Dispersion of Sizing Agent for Carbon Fiber>>

The aqueous dispersion of the sizing agent for carbon fiber of the invention includes the sizing agent for carbon fiber of the invention and water. In addition to these, the aqueous dispersion may also include other components. The "other components" that are included in the aqueous dispersion of the sizing agent for carbon fiber of the invention are incorporated to the extent that the functions provided by the sizing agent for carbon fiber of the invention are not impaired, and examples of the "other components" include a (poly)ester compound, a (poly)urethane compound, a (poly)amide compound, and a (poly)imide compound.

An aqueous dispersion of the sizing agent for carbon fiber of the invention can be produced by mixing the sizing agent for carbon fiber with a surfactant to obtain a uniform material, slowly adding water while stirring this uniform material to obtain a mixture, and thereby subjecting the mixture to phase transfer emulsification.

The term "dispersion" according to the present specification means a state in which the sizing agent forms particles or micelles having a size of about 1 nm to 10 μm in a dispersing medium such as water or an organic solvent, and the mixture forms a suspension with the particles or micelles floating therein.

A sizing treatment to adhere the sizing agent for carbon fiber of the invention to the surface of carbon fibers can be carried out by applying the sizing agent to carbon fibers by a method of immersing carbon fibers in a solution of the sizing agent for carbon fiber or in a dispersion liquid of the sizing agent for carbon fiber by means of a roller; a method of bringing carbon fibers into contact with a roller to which the solution of the sizing agent for carbon fiber or the dispersion liquid of the sizing agent for carbon fiber has been adhered; or the like, and thereafter drying these carbon fibers. Meanwhile, the regulation of the amount of adhesion of the sizing agent to the surface of carbon fibers can be carried out by adjusting the concentration of the solution of the sizing agent for carbon fiber or the dispersion liquid of the sizing agent for carbon fiber, or by adjusting the amount of incorporation thereof. Furthermore, drying can be carried out by utilizing hot air, a hot plate, a heated roller, various infrared heaters, and the like.

The concentration of the sizing agent in the aqueous dispersion of the sizing agent for carbon fiber of the invention, that is, the concentration of components other than volatile components (water or the like that is removed by drying in the sizing treatment) in the aqueous dispersion of the sizing agent for carbon fiber, is usually adjusted to a concentration of about 10% to 50% by mass. The concentration may be adjusted to be lower than 10% by mass in a stage of producing the aqueous dispersion of the sizing agent for carbon fiber; however, the proportion occupied by water in the aqueous dispersion of the sizing agent for carbon fiber becomes large, and it may be economically inefficient in view of transportation, storage, and the like during the period from production to use (sizing treatment of carbon fibers) of the aqueous dispersion of the sizing agent for carbon fiber. Therefore, on the occasion of using the aqueous dispersion of the sizing agent for carbon fiber (performing a sizing treatment of carbon fibers), the aqueous dispersion of the sizing agent for carbon fiber is used after being diluted so as to achieve a desired amount of adhesion of the sizing agent, such that the concentration of the sizing agent will be 0.1% to 10% by mass with respect to the total mass of the aqueous dispersion of the sizing agent for carbon fiber.

<<Sizing Agent-Adhered Carbon Fiber>>

The sizing agent-adhered carbon fibers of the invention have the sizing agent for carbon fiber of the invention adhered to the surface of carbon fibers. As the sizing agent for carbon fiber of the invention is adhered, excellent impregnation of the carbon fiber bundle with a matrix resin, and excellent handling of the carbon fiber bundle in processing such as FW molding are attained.

The amount of adhesion of the sizing agent for carbon fiber is preferably 0.1% to 5.0% by mass, and more preferably 0.2% to 3.0% by mass, with respect to the total mass of the sizing agent-adhered carbon fiber.

The carbon fibers to which the sizing agent for carbon fiber of the invention is adhered may be a pitch-based, a rayon-based, a polyacrylonitrile-based, or any other raw material based carbon fibers, and may be any one of high strength type (low elastic modulus carbon fibers), medium-high elastic modulus carbon fibers, or ultrahigh elastic modulus carbon fibers.

<<Sizing Agent-Adhered Carbon Fiber Bundle>>

The sizing agent-adhered carbon fiber bundle of the invention is a carbon fiber bundle including carbon fibers and a sizing agent for carbon fiber and being bundled with the sizing agent, and the spontaneous dispersion ratio measured by a spontaneous dispersibility test is 3 or higher.

(Method for Spontaneous Dispersibility Test)

The spontaneous dispersibility test is carried out by the following method.

Carbon fiber bundles are cut to a length of 2.5 cm in the fiber longitudinal direction, and thereby specimens are prepared.

At this time, in order to cut the carbon fiber bundles without disturbing the shape of the carbon fiber bundles, carbon fiber bundles that have been pulled out 30 cm from the bobbin are placed on a cutting mat in a state without any twisting or disorderliness, and the carbon fiber bundles are cut with a razor while maintaining the shape.

The widths at the two ends and at the center in the fiber length direction of a specimen are measured, and the average width W0 is calculated.

A bisphenol A type epoxy resin maintained at a temperature in the range of 44° C. to 46° C. (viscosity at 25° C.: 11 to 15 Pa·s) is used as an evaluation liquid for spontaneous dispersibility test.

The evaluation liquid for spontaneous dispersibility test is introduced into a Petri dish and is maintained at a temperature in the range of 44° C. to 46° C. in a state without convection.

The specimen is floated on the evaluation liquid for spontaneous dispersibility test, and this time point is designated as 0 second.

After 60 seconds, the widths at the two ends and at the center in the fiber length direction of the specimen are measured, and the average width W is calculated.

The increase scale factor (average width W/average width W0) in the measurement period (60 seconds) for the average width of the specimen is designated as the spontaneous dispersion ratio of each specimen.

The spontaneous dispersibility test is carried out for each of twenty specimens collected from the same carbon fiber bundle, and the average value of the spontaneous dispersion ratio of each of the specimens is designated as the spontaneous dispersion ratio of the carbon fiber bundle.

Since the sizing agent dissolves in the evaluation liquid as the spontaneous dispersibility test is performed, it is necessary to use a fresh evaluation liquid for each measurement of the spontaneous dispersibility test.

The evaluation liquid for the spontaneous dispersibility test needs to be liquid at a temperature in the range of 44° C. to 46° C. Therefore, when a bisphenol A type epoxy resin having a viscosity of 11 to 15 Pa·s at 25° C. is used, a stable liquid state can be maintained at a temperature in the range of 44° C. to 46° C. Examples of commercially available bisphenol A type epoxy resins having the above-mentioned viscosity characteristics include jER828 (manufactured by Mitsubishi Chemical Corporation), EPICLON 850S (manufactured by DIC Corporation), and ADEKA RESIN EP-4100 (manufactured by Adeka Corporation).

It is preferable that the sizing agent-adhered carbon fiber bundle is formed from the sizing agent-adhered carbon fibers of the invention.

In a case in which a liquid other than a bisphenol A type epoxy resin (viscosity at 25° C.: 11 to 15 Pa·s) is used as the evaluation liquid for spontaneous dispersivity, different measurement results are obtained.

The carbon fiber bundle of the invention has a feature that individual filaments of the carbon fiber bundle are spontaneously dispersed by an interaction with a matrix resin composition, even without applying external force. The sizing agent that can be used for the carbon fiber bundle of the invention has a feature that the sizing agent has excellent wettability to the matrix resin composition and rapidly dissolves in the matrix resin composition, and the surface free energy of the solution in which the sizing agent is dissolved in the matrix resin composition is lower than the surface free energy of the matrix resin composition only. Here, the surface free energy of a liquid can be measured by the Wilhelmy method or the like. Furthermore, the wettability can be measured using the dynamic contact angle between a carbon fiber filament to which the sizing agent has adhered and the matrix resin composition.

Spontaneous dispersion of the carbon fiber bundle in the spontaneous dispersibility test is understood as the following phenomenon.

First, when carbon fiber bundles are floated on the evaluation liquid, the sizing agent adhered to the filaments of the carbon fibers is dissolved in the evaluation liquid. As the sizing agent dissolves in the evaluation liquid, the amount of the sizing agent binding the carbon fiber bundle is decreased, and the binding force between the filaments of the carbon fiber is decreased. Immediately after the carbon fiber bundle (specimen) is floated on the evaluation liquid, and the sizing agent adhered to the carbon fiber bundle dissolves in the evaluation liquid, an "evaluation liquid in which the sizing agent is dissolved at a high concentration" exists near the carbon fiber bundle.

This "evaluation liquid in which the sizing agent is dissolved at a high concentration" has lower surface free energy compared to the evaluation liquid that is far from the specimen (where the sizing agent is not dissolved).

When attention is paid to the filaments of the carbon fiber positioned at the edges of the specimen, the sizing concentration in the evaluation liquid on the carbon fiber bundle side is high, and the concentration of the sizing agent on the opposite side (outside the carbon fiber bundle) is low. Therefore, a force works in a direction in which the carbon fiber bundle spreads.

When the force spreading the carbon fiber bundle exceeds the binding force between the filaments of the carbon fiber bundle, the filament group of the carbon fiber contacting the evaluation liquid spreads in the width direction.

Diffusion of the sizing agent dissolved in the evaluation liquid into the evaluation liquid acts in a direction that eliminates concentration differences; however, as the filament group of the carbon fibers contacting the evaluation liquid spreads in the width direction, filaments of the carbon fiber that exist in the interior in the thickness direction of the carbon fiber bundle, where there is no contact between the filaments and the evaluation liquid, are brought into contact with the evaluation liquid, and from the filaments newly brought into contact with the valuation liquid, the sizing agent dissolves into the evaluation liquid. Thus, the concentration of the sizing agent in the evaluation liquid increases, a concentration difference is maintained, and the width of the carbon fiber bundle keeps spreading over the evaluation liquid.

The sizing agent-adhered carbon fiber bundle of the invention has a feature that a fiber spread ratio A measured by the following method is 150% or less. When the fiber spread ratio A is 150% or less, handling in processing such as filament winding molding is excellent. In the processing, as the carbon fiber bundle is prevented from being spread excessively at a roller or a guide for conveying the carbon fiber bundle, the occurrence of variation in the tow width in processing caused by edge crease of the carbon fiber bundle is suppressed, homogeneous processing is facilitated, and excellent handling is obtained. Therefore, it is preferable. Furthermore, it is preferable that the fiber spread ratio A is 110% or higher. When the fiber spread ratio A is 110% or less, the binding force between filaments in the carbon fiber bundle exerted by the sizing agent is strong, and it may be difficult to impregnate the carbon fiber bundle with a matrix resin.

The fiber spread ratio A described in the present invention is defined by the following formula.

{(Spread Tow width)/(tow width on the bobbin)}× 100(%)

The "tow width on the bobbin" is obtained by making measurement at any three sites excluding traverse folded parts or parts where a change in the external appearance is seen, and calculating the average value thereof.

Furthermore, the "Spread Tow width" is obtained by the following method.

An apparatus 10 for measuring the fiber spread ratio A as shown in FIG. 1 is used. A carbon fiber bundle is unwound from a carbon fiber bundle (bobbin 1) in a cylindrical form wound onto a paper core applying a traverse, and the carbon fiber bundle is led to a fiber spreading apparatus composed of three fiber-spreading bars 2 (cylinder made of stainless steel, diameter 10 mm, hard chrome plating, Vickers hardness 1,000, surface roughness Ra: 0.8 μm) via a roller and is brought into contact with each of the fiber-spreading bars at a wrap angle of 60°. Thus, a fiber spreading treatment is carried out. Thereafter, the carbon fiber bundle is conveyed via rollers using a drive roller 3, while being applied with a tension of 1.0 cN/tex, keeping the width of the tow, and the tow width is measured in a non-contact manner by means of a laser type length measurement sensor 4.

Meanwhile, the unwinding tension is set to 0.30 cN/tex, and the travel speed of the carbon fiber bundle is set to 10 m/min. The output of the laser type length measurement sensor is imported at a frequency of once in 100 ms, and the average value of a period of 10 minutes is designated as "Spread Tow width".

It is preferable that the sizing agent-adhered carbon fiber bundle of the invention is a carbon fiber bundle including the sizing agent for carbon fiber of the invention. The sizing agent-adhered carbon fiber bundle of the invention has satisfactory carbon fiber bundle handling in processing such as FW molding as the sizing agent for carbon fiber of the invention is applied, and impregnation of the carbon fiber bundle with a resin is achieved satisfactorily. Furthermore, a carbon fiber composite material molded product produced using the sizing agent-adhered carbon fiber bundle of the invention has satisfactory mechanical characteristics.

According to the invention, a sizing agent-adhered carbon fiber bundle means a carbon fiber bundle in which a sizing agent is dispersed and maintained in the entirety of the interior and the surface of the carbon fiber bundle, in the form in which the sizing agent coats at least a portion of the surface of individual carbon fibers that constitute the carbon fiber bundle, or in the form in which the sizing agent connects gaps between a carbon fiber and a carbon fiber.

Particularly, in a case in which the sizing agent for carbon fiber of the invention includes component (D), a sizing agent-adhered carbon fiber bundle including the sizing agent has excellent friction resistance and has satisfactory handling in processing.

Since a sizing agent-adhered carbon fiber bundle including the sizing agent for carbon fiber of the invention has excellent friction resistance against mechanical friction, has less fuzzing, and is easy to handle in processing such as weaving, fiber base materials such as a woven fabric and a multi axial warp knit with less fuzzing are obtained.

Furthermore, since a sizing agent-adhered carbon fiber bundle including the sizing agent for carbon fiber of the invention has excellent friction resistance against mechanical friction and has less fuzzing, and since impregnation of the carbon fiber bundle with a matrix resin is achieved satisfactorily, even if a roller or a guide is used in processing such as filament winding molding or pultrusion molding, fuzzing or winding around the roller does not occur, and impregnation with a matrix resin can be achieved easily in a short time period. Therefore, the excellent productivity of these molding methods are not impaired excellent.

The sizing agent-adhered carbon fiber bundle including the sizing agent for carbon fiber of the invention can be processed into a carbon fiber composite material by impregnating it with a matrix resin composition in order to make it into the form of an intermediate material such as a uniaxial prepreg, a cross prepreg, a towpreg, a single fiber sheet prepreg, or a single fiber mat prepreg. The matrix resin composition is not particularly limited; however, examples include an epoxy resin; radical polymerization system resins such as an acrylic resin, a vinyl ester resin, an unsaturated polyester resin, and a thermoplastic acrylic resin; and a phenolic resin.

<<Carbon Fiber Composite Material>>

The carbon fiber composite material of the invention is a product obtainable by molding a carbon fiber composite material incorporation sizing agent-adhered carbon fibers including the sizing agent for carbon fiber of the invention. As a matrix resin, an epoxy resin, an acrylic resin, an unsaturated polyester resin, a radical polymerization system resin such as a vinyl ester resin, a phenolic resin, or the like can be used.

By molding a carbon fiber composite material, a carbon fiber composite material molded product can be obtained.

<<Method for Producing Carbon Fiber Composite Material>>

The method for producing a carbon fiber composite material of the invention includes impregnating the sizing agent-adhered carbon fiber bundle of the invention with a thermosetting resin composition, and then heating and curing the thermosetting resin composition.

The proportion of the thermosetting resin composition is preferably 30 to 70 parts by mass, and more preferably 40 to 60 parts by mass, with respect to 100 parts by mass of the sizing agent-adhered carbon fiber bundle.

The heating conditions employed at the time of heating and curing the thermosetting resin composition is preferably 60° C. to 200° C., and preferably 130° C. to 180° C. Furthermore, it is preferable to heat the resin composition for 1 to 200 minutes, and more preferably 15 to 60 minutes at the above-described temperature.

<<Method for Producing Carbon Fiber-Reinforced Pressure Vessel>>

The method for producing a carbon fiber-reinforced pressure vessel of the invention includes impregnating the sizing agent-adhered carbon fiber bundles of the invention with a thermosetting resin composition by a filament winding method, and then heating and curing the thermosetting resin composition.

The proportion of the thermosetting resin composition in the filament winding method is preferably 30 to 70 parts by mass, and more preferably 40 to 60 parts by mass, with respect to 100 parts by mass of the sizing agent-adhered carbon fiber bundle.

In the filament winding method, the heating conditions employed at the time of heating and curing the thermosetting resin composition is preferably 60° C. to 200° C., and preferably 130° C. to 180° C. Furthermore, it is preferable to perform heating at the above-described temperature for 30 to 200 minutes, and it is more preferable to performing heating for 60 to 150 minutes.

EXAMPLES

Hereinafter, the invention will be specifically described by way of Examples; however, the invention is not intended to be limited by these.

In Table 1 and Table 2, the raw materials used in Examples and Comparative Examples are described.

TABLE 1

| Component | Trade name | Compound name | Manufacturer |
|---|---|---|---|
| Component (B) | E157S70 | Bisphenol A novolac type epoxy resin | Mitsubishi Chemical Corporation |
| | HP-7200H | Dicyclopentadiene type epoxy resin | DIC Corporation |
| | E1032H60 | Tris(hydroxyphenyl)methane type epoxy resin | Mitsubishi Chemical Corporation |
| Component (C) | jER828 | Bisphenol A type epoxy resin | Mitsubishi Chemical Corporation |
| | jER807 | Bisphenol F type epoxy resin | Mitsubishi Chemical Corporation |
| Component (D) | EXCEPARL SS | Stearyl stearate | Kao Corporation |
| | EXCEPARL EH-S | 2-Ethylhexyl stearate | Kao Corporation |
| Component (E) | FINESURF FON-60 | 6-mol adduct of ethylene oxide to isostearyl alcohol | Aoki Oil Industrial Co., Ltd. |
| | ADEKA PLURONIC FS88 | Pluronic type surfactant | ADEKA Corporation |
| | HITENOL NF-17 | Aromatic anionic surfactant | Dai-ichi Kogyo Seiyaku Co., Ltd. |
| | AQUALON BC-10 | Aromatic anionic surfactant | Dai-ichi Kogyo Seiyaku Co., Ltd. |
| | NEWCOL CMP-11 | Aromatic anionic surfactant | Nippon Nyukazai Co., Ltd. |

TABLE 2

| | Trade name or name | Percentage content of component (A) | Manufacturer |
|---|---|---|---|
| Raw material composition A | ADEKA RESIN EPU-73B | 35% | ADEKA Corporation |
| | Produced Composition 1 | 70% | Mitsubishi Chemical Corporation |
| | ADEKA RESIN EPU-78-11 | 25% | ADEKA Corporation |

Since the raw material composition A described in Table 2 includes a liquid bisphenol A type epoxy resin or a bisphenol F type epoxy resin (each is a component (C)) in addition to component (A), the percentage content of component (A) is described together.

<Production of Produced Composition 1>

Produced Composition 1 was obtained by repeatedly performing extraction from ADEKA RESIN EPU-73B described in Table 2 using toluene and methanol.

The raw materials used in Reference Examples are described in Table 3.

TABLE 3

| | Trade name or name | Manufacturer |
|---|---|---|
| Urethane-modified epoxy resin | HYDRAN N320 | DIC Corporation |
| Bisphenol A ethylene oxide 20-mol adduct | Produced composition 2 | Mitsubishi Chemical Corporation |

Example 1-1

<Production of Aqueous Dispersion of Sizing Agent for Carbon Fiber>

To each of the sizing agents for carbon fiber obtained by mixing raw material composition A and components (B) to (E) described in Table 1 and Table 2 at the parts by mass described in Table 4, ion-exchanged water was added, and an aqueous dispersion of the sizing agent for carbon fiber was obtained by phase transfer emulsification using a homomixer. Furthermore, the concentration of the sizing agent in the aqueous dispersion was adjusted to be 40% by mass.

In Table 7, the mixing proportions of component (A), component (B), and component (C) of the sizing agent for carbon fiber that is obtainable by mixing raw materials at the parts by mass described in Table 4, are described. Meanwhile, these mixing proportions are parts by mass of the respective components with respect to 100 parts by mass of the sum of component (A), component (B), and component (C).

<Measurement of Sizing Agent Concentration in Aqueous Dispersion>

About 2 g of an aqueous dispersion of a sizing agent was weighed in a Petri dish (diameter 45 mm, depth 10 mm) made of aluminum, and the aqueous dispersion was dried for one hour in a hot air dryer at 105° C. Subsequently, the component remaining on the Petri dish was weighed. The mass of the aqueous dispersion of a sizing agent was designated as W1, the mass of the component remaining after drying was designated as W2, and the concentration of the sizing agent in the aqueous dispersion liquid was calculated by the following calculation formula.

Concentration (%) of sizing agent in aqueous dispersion of sizing agent=$\{W2/W1\} \times 100$ <Sizing Treatment of Carbon Fibers>

PYROFIL TRH50 18M (trade name, manufactured by Mitsubishi Chemical Corporation; number of filaments 18,000, fiber diameter 6 μm), which is a carbon fiber bundle to which a sizing agent is not applied, was immersed and passed through an immersion tank filled with an aqueous dispersion of a sizing agent, and then the carbon fiber bundle was dried for 10 minutes in an atmosphere at 140° C. and then wound around a bobbin. At this time, an aqueous dispersion of a sizing agent that had been adjusted to 40% by mass was used after the aqueous dispersion was diluted such that the concentration of the sizing agent in the aqueous dispersion of the sizing agent in the immersion tank would be about 2.2% by mass.

<Measurement of Amount of Adhesion of Sizing Agent in Carbon Fiber Bundle>

The amount of adhesion of the sizing agent in the carbon fiber bundle after application of the sizing agent was measured by a Soxhlet extraction method using methyl ethyl ketone. The extraction time was set to 1 hour.

<Spontaneous Dispersibility Test>

Spontaneous dispersibility was evaluated by the method described above. In addition, jER828 (manufactured by Mitsubishi Chemical Corporation) was used as the evaluation liquid.

<Production of Pressure Container and Measurement of Bursting Pressure>

A carbon fiber bundle to which a sizing agent had been applied was wound around an aluminum liner having a capacity of 9 liters (total length 540 mm, body part length 415 mm, body part outer diameter 163 mm, thickness of body part at the center 3 mm) using a FW apparatus. The aluminum liner used was formed from a material obtained by subjecting an aluminum base material defined in JIS H 4040 A6061-T6 to a heat treatment. The carbon fiber bundle was unwound from a bobbin wound around a paper tube, the position was adjusted through a guide roll, and subsequently the carbon fiber bundle was impregnated with a matrix resin composition by supplying a fixed amount of the matrix resin composition using a touch roll. Subsequently, the resin impregnated carbon fiber bundle was wound around the liner as follows. First, a hoop layer having an angle of 88.6° with respect to the direction of the axis of rotation of the liner was formed on the body part as a first layer that came into contact with the body part of the liner. Subsequently, a helical layer for reinforcing the head of the liner was laminated at an angle of 11.0° with respect to the direction of the axis of rotation of the liner, and then the layers described in Laminate Nos. 3 to 8 indicated in Table 16 were sequentially formed. Thus, a container intermediate was produced.

The container intermediate thus obtained was removed from the FW apparatus and suspended in a heating furnace. The temperature inside the furnace was increased to 135° C. at a rate of 2° C./minute and then was maintained at 135° C. for 2 hours, and thus the container intermediate was cured. Subsequently, the temperature inside the furnace was cooled to 60° C. at a rate of 1° C./minute, and a composite material reinforced pressure container was obtained. The evaluation results for the tank performance (measurement results of bursting pressure: tank burst (MPa)) of the composite material reinforced pressure container are shown in Table 7.

In addition, as the matrix resin composition, a mixture obtained by adding 80 parts by mass of XN1045 to 100 parts by mass of jER828 was used.

<Evaluation of Impregnation of Resin in Production of Pressure Container>

The intake of the matrix resin composition on the touch roll at the time of production of the pressure container and voids in a cross-section of the pressure container thus produced were evaluated according to the following criteria, and the results are shown in Table 7.

A: Intake of the matrix resin composition is satisfactory on the touch roll, and voids are hardly seen in a cross-section of the pressure container.

B: Intake of the matrix resin composition is slightly slow on the touch roll; however, voids are hardly seen in a cross-section of the pressure container.

C: Intake of the matrix resin composition is slightly slow on the touch roll, and some voids are seen in a cross-section of the pressure container.

D: Intake of the matrix resin composition is slow on the touch roll, and voids are seen in a cross-section of the pressure container.

<Evaluation of Processability of Carbon Fiber Bundle in Production Process for Pressure Container>

The processability at the time of production of the pressure container described above was evaluated according to the following criteria, and the results are shown in Table 7.

A: Accumulation of fuzz on the guide roll is hardly seen.

B: There is a slight accumulation of fuzz on the guide roll.

C: There is a large accumulation of fuzz on the guide roll; however, winding around the guide roll is not seen.

D: There is a very large accumulation of fuzz on the guide roll, and winding around the guide roll occurs.

<Evaluation of Fiber Spread Ratio A>

An apparatus 10 for measuring the fiber spread ratio A as shown in FIG. 1 was used. A carbon fiber bundle was unwound from a carbon fiber bundle (bobbin 1) in a cylindrical form wound on a paper tube applying a traverse, and the carbon fiber bundle was led to a fiber spreading apparatus composed of three fiber-spreading bars 2 (cylinder made of stainless steel, diameter 10 mm, hard chrome plating, Vickers hardness 1,000, surface roughness Ra: 0.8 µm) via a roller and was brought into contact with each of the fiber-spreading bars at a wrap angle of 60°. Thus, a fiber spreading treatment was carried out. Thereafter, the carbon fiber bundle was conveyed via rollers using a drive roller 3, while being applied with a tension of 1.0 cN/tex, keeping the width of the tow, and the tow width was measured in a non-contact manner by means of a laser type length measurement sensor 4.

Meanwhile, the unwinding tension was set to 0.30 cN/tex, and the travel speed of the carbon fiber bundle was set to 10 m/min. The output of the laser type length measurement sensor was imported at a frequency of once in 100 ms, and the average value of a period of 10 minutes was designated as "Spread Tow width".

The fiber spread ratio A was calculated by the following formula.

Fiber Spread Ratio $A=\{(\text{Spread Tow Width})/(\text{Tow Width on the Bobbin})\}\times 100(\%)$ The "tow width on the bobbin" of the above formula was obtained by making measurement at any three sites excluding traverse folded parts or parts where a change in the external appearance was seen, and calculating the average value thereof.

<Evaluation of Resin Impregnation>

A resin adhesion ratio was measured by the following method, and thus, an evaluation of resin impregnation was carried out.

By using a FW apparatus, a resin was supplied to a carbon fiber bundle to which a sizing agent had been applied, with a touch roller, and the carbon fiber bundle was wound on an mandrel of an aluminum liner (total length 540 mm, body part length 415 mm, body part outer diameter 163 mm, and thickness of body part at the center 3 mm).

The touch roller had a diameter of φ200 mm, and 10 mm of the lower part of the touch roller was immersed in a resin bath. The touch roller was provided with a metal blade, and the clearance between the roller and the blade was set to 0.1 mm. jER828 was used as the resin, and the temperature of the resin was adjusted to 35° C. by immersing the resin bath in warm water. The top of this touch roller was brought into contact with the carbon fiber bundle adhered with the sizing agent at a wrap angle of 50°. Furthermore, the tow width on the sending side of the roll immediately before the touch roller was restricted to $5.5\times 10^{-3}$ mm/tex with a metal guide having a diameter of φ10. The tension of the carbon fiber bundle immediately before contacting the touch roller was set to 1.2 cN/tex, and the winding speed was set to 10/min.

As described in Table 7, in Example 1-1, the processibility in process for production of the pressure container was slightly poor; however, the impregnation of the resin was satisfactory, and the performance of the pressure container thus obtained was satisfactory.

Examples 2-1 to 24-1

Sizing-treated carbon fiber bundles were obtained in the same manner as in Example 1-1, except that the raw material compositions A and components (B) to (E) described in Table 1 and Table 2 were mixed at the parts by mass described in Tables 4 to 6, and an evaluation similar to that of Example 1-1 was carried out using the carbon fiber bundles thus obtained. The results are presented in Tables 7 to 9.

Furthermore, the mixing proportions of component (A), component (B), and component (C) of the sizing agent for carbon fiber obtainable by mixing the raw materials at the parts by mass described in Tables 4 to 6 are described in Tables 7 to 9. Meanwhile, these mixing proportions are parts by mass of the respective components with respect to 100 parts by mass of the sum of component (A), component (B), and component (C).

Examples 25-1

A carbon fiber bundle that had been sizing-treated in the same manner as in Example 2-1, except that PYROFIL TRH50 60M (trade name: manufactured by Mitsubishi Chemical Corporation; number of filaments 60,000, fiber diameter 6 μm) was used instead of PYROFIL TRH50 18M, was used, and an evaluation similar to Example 1-1 was carried out. The results are presented in Table 9.

Example 26-1

A carbon fiber bundle that had been sizing-treated in the same manner as in Example 2-1, except that PYROFIL TR50D 12L (trade name: manufactured by Mitsubishi Chemical Corporation, number of filaments 12,000, fiber diameter 7 μm) was used instead of PYROFIL TRH50 18M, was used, and an evaluation similar to Example 1-1 was carried out. The results are presented in Table 9.

Comparative Examples 1-1 to 5-1

Sizing-treated carbon fiber bundles were obtained in the same manner as in Example 1-1, except that the raw material composition A and components (B) to (E) described in Table 1 and Table 2 were mixed at the parts by mass described in Table 10, and an evaluation similar to Example 1-1 was carried out using the carbon fiber bundles thus obtained. The results are presented in Table 11.

Furthermore, the mixing proportions of component (A), component (B), and component (C) of the sizing agent for carbon fiber obtainable by mixing the raw materials at the parts by mass described in Table 10 are described in Table 11. Meanwhile, these mixing proportions are parts by mass of the various components with respect to 100 parts by mass of the sum of component (A), component (B), and component (C).

Reference Examples 1-1 and 2-1

Sizing-treated carbon fiber bundles were obtained in the same manner as in Example 1-1, except that the mixing amounts described in Table 12 were used, and a similar evaluation was carried out using the carbon fiber bundles thus obtained. The impregnation of the resin in the production process for the pressure container was poor and not satisfactory. The processability and the performance of the pressure containers thus obtained were satisfactory. The results are presented in Table 12.

TABLE 4

| | | Example 1-1 | Example 2-1 | Example 3-1 | Example 4-1 | Example 5-1 | Example 6-1 | Example 7-1 | Example 8-1 |
|---|---|---|---|---|---|---|---|---|---|
| Raw material composition A | EPU-73B | 30 | 30 | 30 | 30 | 30 | 45 | 55 | 55 |
| | Produced composition 1 | | | | | | | | |
| | EPU-78-11 | | | | | | | | |
| Component (B) | E157S70 | | | | | 45 | | | 30 |
| | HP-7200H | 15 | 30 | 45 | | | 20 | 30 | |
| | E1032H60 | | | | | 45 | | | |
| Component (C) | jER828 | | | | | | | | |
| | jER807 | 40 | 25 | 10 | 10 | 10 | 20 | | |
| Component (D) | EXCEPARL SS | | | | | | | | |
| | EXCEPARL EH-S | | | | | | | | |
| Component (E) | FINESURF FON-60 | 2 | 2 | 2 | 2 | 2 | 2 | 2 | 2 |
| | ADEKA PLURONIC FS88 | | | | | | | | |
| | HITENOL NF-17 | | | | | | | 13 | 13 |
| | AQUALON BC-10 | 13 | 13 | 13 | 13 | 13 | 13 | | |
| | NEWCOL CMP-11 | | | | | | | | |
| Concentration (%) of sizing agent in aqueous dispersion | | 2.2 | 2.3 | 2.3 | 2.1 | 2.2 | 2.2 | 2.3 | 2.2 |
| Amount of adhesion (%) of sizing agent to carbon fibers | | 0.9 | 1.0 | 1.1 | 1.0 | 1.1 | 1.0 | 1.1 | 1.0 |

TABLE 5

| | | Example 9-1 | Example 10-1 | Example 11-1 | Example 12-1 | Example 13-1 | Example 14-1 | Example 15-1 | Example 16-1 |
|---|---|---|---|---|---|---|---|---|---|
| Raw material composition A | EPU-73B | 55 | 70 | | | | | | 30 |
| | Produced composition 1 | | | 70 | 50 | 30 | 45 | | |
| | EPU-78-11 | | | | | | | 55 | |
| Component (B) | E157S70 | | | | | | | | |
| | HP-7200H | | 15 | 15 | 30 | 45 | 20 | 30 | 30 |
| | E1032H60 | 30 | | | | | | | |

TABLE 5-continued

|  |  | Example 9-1 | Example 10-1 | Example 11-1 | Example 12-1 | Example 13-1 | Example 14-1 | Example 15-1 | Example 16-1 |
|---|---|---|---|---|---|---|---|---|---|
| Component (C) | jER828 |  |  |  |  |  |  |  | 25 |
|  | jER807 |  |  |  | 5 | 10 | 20 |  |  |
| Component (D) | EXCEPARL SS |  |  |  |  |  |  |  |  |
|  | EXCEPARL EH-S |  |  |  |  |  |  |  |  |
| Component (E) | FINESURF FON-60 | 2 | 2 | 2 | 2 | 2 | 2 | 2 | 2 |
|  | ADEKA PLURONIC FS88 |  |  |  |  |  |  |  |  |
|  | HITENOL NF-17 | 13 | 13 |  |  |  |  |  |  |
|  | AQUALON BC-10 |  |  | 13 | 13 | 13 | 13 | 13 | 13 |
|  | NEWCOL CMP-11 |  |  |  |  |  |  |  |  |
| Concentration (%) of sizing agent in aqueous dispersion |  | 2.2 | 2.1 | 2.1 | 2.2 | 2.2 | 2.2 | 2.3 | 2.3 |
| Amount of adhesion (%) of sizing agent to carbon fibers |  | 1.1 | 1.0 | 0.9 | 1.0 | 1.0 | 1.0 | 1.0 | 1.0 |

TABLE 6

|  |  | Example 17-1 | Example 18-1 | Example 19-1 | Example 20-1 | Example 21-1 | Example 22-1 | Example 23-1 | Example 24-1 | Example 25-1 | Example 26-1 |
|---|---|---|---|---|---|---|---|---|---|---|---|
| Raw material composition A | EPU-73B | 42 | 35 | 40 | 40 | 20 | 75 |  | 20 | 30 | 30 |
|  | Produced composition 1 |  |  |  |  |  |  | 75 |  |  |  |
| Component (B) | EPU-78-11 |  |  |  |  |  |  |  |  |  |  |
|  | E157S70 |  |  |  |  |  |  |  |  |  |  |
|  | HP-7200H | 18 | 30 | 20 | 20 | 10 | 10 | 10 | 25 | 30 | 30 |
|  | E1032H60 |  |  |  |  |  |  |  |  |  |  |
| Component (C) | jER828 | 18 | 10 |  |  |  |  |  |  |  |  |
|  | jER807 |  |  | 15 | 20 | 55 |  |  | 40 | 25 | 25 |
| Component (D) | EXCEPARL SS |  | 10 |  |  |  |  |  |  |  |  |
|  | EXCEPARL EH-S |  |  |  | 10 |  |  |  |  |  |  |
| Component (E) | FINESURF FON-60 | 2 | 2 | 2 |  | 2 | 2 | 2 | 2 | 2 | 2 |
|  | ADEKA PLURONIC FS88 |  |  |  | 20 |  |  |  |  |  |  |
|  | HITENOL NF-17 | 10 |  |  |  | 13 | 13 |  | 13 |  |  |
|  | AQUALON BC-10 |  | 13 | 13 |  |  |  | 13 |  | 13 | 13 |
|  | NEWCOL CMP-11 | 10 |  |  |  |  |  |  |  |  |  |
| Concentration (%) of sizing agent in aqueous dispersion |  | 2.2 | 2.2 | 2.3 | 2.3 | 2.2 | 2.3 | 2.3 | 2.2 | 2.5 | 2.5 |
| Amount of adhesion (%) of sizing agent to carbon fibers |  | 1.0 | 0.9 | 1.0 | 1.0 | 0.9 | 1.0 | 1.0 | 1.0 | 1.0 | 1.0 |

TABLE 7

|  | Example 1-1 | Example 2-1 | Example 3-1 | Example 4-1 | Example 5-1 | Example 6-1 | Example 7-1 | Example 8-1 |
|---|---|---|---|---|---|---|---|---|
| Component (A) | 12 | 12 | 12 | 12 | 12 | 19 | 23 | 23 |
| Component (B) | 18 | 35 | 53 | 53 | 53 | 24 | 35 | 35 |
| Component (C) | 70 | 52 | 35 | 35 | 35 | 58 | 42 | 42 |
| Processability | C | B | B | B | B | B | B | B |
| Impregnation of resin in production of pressure container | A | A | B | B | B | A | A | A |
| Tank burst (MPa) | 106 | 107 | 107 | 107 | 106 | 111 | 110 | 111 |
| Tow width (mm) on bobbin | 6.0 | 5.8 | 6.1 | 6.1 | 5.9 | 6.0 | 6.0 | 6.1 |
| Spontaneous dispersibility | 6.1 | 5.8 | 3.8 | 3.7 | 3.7 | 8.2 | 6.4 | 6.4 |
| Fiber spread ratio A | 144% | 126% | 117% | 117% | 119% | 134% | 123% | 124% |
| Resin adhesion ratio | 21.9% | 20.4% | 17.8% | 18.5% | 18.7% | 21.2% | 19.8% | 20.0% |

TABLE 8

|  | Example 9-1 | Example 10-1 | Example 11-1 | Example 12-1 | Example 13-1 | Example 14-1 | Example 15-1 | Example 16-1 |
|---|---|---|---|---|---|---|---|---|
| Component (A) | 23 | 29 | 58 | 41 | 25 | 37 | 16 | 12 |
| Component (B) | 35 | 18 | 18 | 35 | 53 | 24 | 35 | 35 |

TABLE 8-continued

|  | Example 9-1 | Example 10-1 | Example 11-1 | Example 12-1 | Example 13-1 | Example 14-1 | Example 15-1 | Example 16-1 |
|---|---|---|---|---|---|---|---|---|
| Component (C) | 42 | 54 | 25 | 24 | 22 | 39 | 49 | 52 |
| Processability | B | C | C | C | B | B | B | B |
| Impregnation of resin in production of pressure container | A | A | B | B | B | A | A | A |
| Tank burst (MPa) | 109 | 110 | 111 | 110 | 109 | 110 | 111 | 106 |
| Tow width (mm) on bobbin | 6.0 | 6.1 | 6.2 | 5.9 | 5.8 | 6.0 | 5.9 | 6.0 |
| Spontaneous dispersibility | 6.2 | 3.1 | 3.3 | 3.2 | 3.1 | 5.2 | 5.6 | 5.1 |
| Fiber spread ratio A | 125% | 142% | 139% | 120% | 116% | 132% | 125% | 124% |
| Resin adhesion ratio | 20.2% | 21.7% | 21.1% | 19.6% | 17.2% | 22.7% | 21.4% | 21.5% |

TABLE 9

|  | Example 17-1 | Example 18-1 | Example 19-1 | Example 20-1 | Example 21-1 | Example 22-1 | Example 23-1 | Example 24-1 | Example 25-1 | Example 26-1 |
|---|---|---|---|---|---|---|---|---|---|---|
| Component (A) | 19 | 16 | 19 | 18 | 8 | 31 | 62 | 8 | 12 | 12 |
| Component (B) | 23 | 40 | 27 | 25 | 12 | 12 | 12 | 29 | 35 | 35 |
| Component (C) | 58 | 44 | 55 | 58 | 80 | 57 | 26 | 62 | 52 | 52 |
| Processability | B | A | A | B | D | D | D | D | B | B |
| Impregnation of resin in production of pressure container | A | A | A | A | B | A | B | B | B | A |
| Tank burst (MPa) | 110 | 111 | 111 | 110 | 103 | 102 | 106 | 103 | 102 | 106 |
| Tow width (mm) on bobbin | 6.0 | 6.2 | 6.1 | 5.8 | 6.0 | 5.9 | 6.2 | 6.1 | 11.2 | 5.5 |
| Spontaneous dispersibility | 6.0 | 5.8 | 6.2 | 6.2 | 3.4 | 5.0 | 3.7 | 3.3 | 4.1 | 6.0 |
| Fiber spread ratio A | 132% | 120% | 136% | 131% | 131% | 146% | 145% | 141% | 132% | 125% |
| Resin adhesion ratio | 22.1% | 21.2% | 23.1% | 20.7% | 23.3% | 20.5% | 21.2% | 22.5% | 16.8% | 22.3% |

TABLE 10

|  |  | Comparative Example 1-1 | Comparative Example 2-1 | Comparative Example 3-1 | Comparative Example 4-1 | Comparative Example 5-1 | Comparative Example 6-1 |
|---|---|---|---|---|---|---|---|
| Raw material composition A | EPU-73B |  |  |  | 35 |  | 85 |
|  | Produced composition 1 |  | 50 | 30 |  |  |  |
|  | EPU-78-11 | 20 |  |  |  |  |  |
| Component (B) | E157S70 | 45 |  |  |  |  |  |
|  | HP-7200H |  | 35 | 50 | 50 | 55 |  |
|  | E1032H60 |  |  |  |  |  |  |
| Component (C) | jER828 |  |  |  |  |  |  |
|  | jER807 | 20 |  | 5 |  | 30 |  |
| Component (D) | EXCEPARL SS |  |  |  |  |  |  |
|  | EXCEPARL EH-S |  |  |  |  |  |  |
| Component (E) | FINESURF FON-60 | 2 | 2 | 2 | 2 | 2 | 2 |
|  | ADEKA PLURONIC FS88 |  |  |  |  |  |  |
|  | HITENOL NF-17 | 13 |  |  |  |  |  |
|  | AQUALON BC-10 |  | 13 | 13 | 13 | 13 | 13 |
|  | NEWCOL CMP-11 |  |  |  |  |  |  |
| Concentration (%) of sizing agent in aqueous dispersion |  | 2.1 | 2.3 | 2.2 | 2.2 | 2.2 | 2.2 |
| Amount of adhesion (%) of sizing agent to carbon fibers |  | 0.9 | 1.1 | 1.0 | 0.9 | 1.0 | 0.9 |

TABLE 11

|  | Comparative Example 1-1 | Comparative Example 2-1 | Comparative Example 3-1 | Comparative Example 4-1 | Comparative Example 5-1 | Comparative Example 6-1 |
|---|---|---|---|---|---|---|
| Component (A) | 6 | 41 | 25 | 14 | 0 | 35 |
| Component (B) | 53 | 41 | 59 | 59 | 65 | 0 |
| Component (C) | 41 | 18 | 16 | 27 | 35 | 65 |

TABLE 11-continued

| | Comparative Example 1-1 | Comparative Example 2-1 | Comparative Example 3-1 | Comparative Example 4-1 | Comparative Example 5-1 | Comparative Example 6-1 |
|---|---|---|---|---|---|---|
| Processability | C | C | C | C | C | D |
| Impregnation of resin in production of pressure container | D | D | D | D | D | B |
| Tank burst (MPa) | 102 | 103 | 105 | 105 | 96 | 105 |
| Tow width (mm) on bobbin | 5.9 | 6.0 | 6.1 | 6.0 | 6.0 | 5.9 |
| Spontaneous dispersibility | 2.7 | 2.6 | 2.0 | 2.7 | 0.9 | 4.3 |
| Fiber spread ratio A | 117% | 116% | 112% | 114% | 111% | 157% |
| Resin adhesion ratio | 17.4% | 17.7% | 14.8% | 15.4% | 14.3% | 23.1% |

TABLE 12

| | Reference Example 1-1 | Reference Example 2-1 |
|---|---|---|
| HYDRAN N320 | 100 | 75 |
| Produced composition 2 | | 25 |
| Concentration (%) of sizing agent in aqueous dispersion | 2.2 | 2.3 |
| Amount of adhesion (%) of sizing agent to carbon fibers | 0.9 | 1.0 |
| Processability | A | B |
| Impregnation of resin in production of pressure container | D | D |
| Tank burst (MPa) | 110 | 110 |
| Tow width (mm) on bobbin | 6.1 | 6.2 |
| Spontaneous dispersibility | 0.9 | 1.0 |
| Fiber spread ratio A | 112% | 116% |
| Resin adhesion ratio | 16.2% | 17.8% |

In Table 13, the raw materials used in Examples 1-2 to 10-2 and Comparative Examples 1-2 to 6-2 are shown.

TABLE 13

| Component | Name | Substance name | Manufacturer |
|---|---|---|---|
| Component (A) | Ester A1 | Aromatic polyester resin | Synthesized product |
| | Ester A2 | Aromatic polyester resin | Synthesized product |
| Component (B) | HP7200H | Dicyclopentadiene type epoxy resin | DIC Corporation |
| Component (C) | jER828 | Bisphenol A type epoxy resin | Mitsubishi Chemical Corporation |
| | JER807 | Bisphenol F type epoxy resin | Mitsubishi Chemical Corporation |
| Component (E) | NEWCOL 2614 | Polyoxyethylene polycyclic phenyl ether | Nippon Nyukazai Co., Ltd. |

Production Example of Ester A1

A bisphenol A-EO 80 mol adduct (number of added mol of EO (ethylene oxide) with respect to 1 mol of bisphenol A: 80 mol) was prepared by the following procedure.

228 parts by mass of bisphenol A, 1,000 parts by mass of toluene, and 3 parts by mass of potassium hydroxide were introduced into a pressure-resistant reactor, and under the conditions of 100° C. and −0.1 MPa, 3,520 parts by mass of EO was introduced thereinto for 3 hours while the pressure was adjusted so as not to exceed 0.5 MPa. After the mixture was aged for 1 hour at 120° C., the pressure was reduced to −0.1 MPa, and toluene was distilled off. Thus, 3,700 parts by mass of a bisphenol A-EO 80 mol adduct was obtained.

1,580 parts by mass of an EO adduct of bisphenol A obtained by adding 2 mol of EO to 1 mol of bisphenol A ("NEWPOL BPE-20" manufactured by Sanyo Chemical Industries, Ltd.; hereinafter, simply described as "BPE-20"), 996 parts by mass of terephthalic acid (alcohol/acid=5/6 molar ratio), and 2 parts by mass of tetraisopropoxytitanate were allowed to react for 10 hours in a reaction vessel under a nitrogen gas stream at 170° C. while water was distilled off. To this, 1,590 parts by mass of the bisphenol A-EO 80 mol adduct was further added, and the pressure was reduced to −0.1 MPa. The mixture was caused to react at 180° C. for 10 hours while water was distilled off, and 3,900 parts by mass of ester A1 was obtained.

Production Example of Ester A2

A bisphenol A-EO 40 mol adduct (number of added mol of EO (ethylene oxide) with respect to 1 mol of bisphenol A: 40 mol) was prepared by the following procedure.

228 parts by mass of bisphenol A, 400 parts by mass of toluene, and 2 parts by mass of potassium hydroxide were introduced into a pressure-resistant reactor, and under the conditions of 100° C. and −0.1 MPa, 1,760 parts by mass of EO was introduced thereinto for 3 hours while the pressure was adjusted so as not to exceed 0.5 MPa. After the mixture was aged for 1 hour at 120° C., the pressure was reduced to −0.1 MPa, and toluene was distilled off. Thus, 1,980 parts by mass of a bisphenol A-EO 40 mol adduct was obtained.

A mixture of 1,264 parts by mass of BPE-20, 830 parts by mass of terephthalic acid (alcohol/acid=4/5 molar ratio), and 2 parts by mass of tetraisopropoxytitanate was allowed to react for 10 hours in a reaction vessel under a nitrogen gas stream at 170° C. while water was distilled off. To this, 1,928 parts by mass of the bisphenol A-EO 40 mol adduct was further added, the pressure was reduced to −0.1 MPa, and the mixture was caused to react at 180° C. for 10 hours while water was distilled off. Thus, 3,800 parts by mass of ester A2 was obtained.

Example 1-2

<Production of Aqueous Dispersion of Sizing Agent for Carbon Fiber>

Components (A) to (E) described in Table 13 were mixed at the proportions (parts by mass) described in the row of Example 1-2 of Table 14, and thereby a sizing agent for carbon fiber was obtained. Ion-exchanged water was added to the sizing agent for carbon fiber thus obtained, and an aqueous dispersion of the sizing agent for carbon fiber was obtained by phase transfer emulsification using a homomixer. Furthermore, the concentration of the sizing agent in the aqueous dispersion was adjusted to be 30% by mass.

<Measurement of Concentration of Sizing Agent in Aqueous Dispersion>

About 2 g of an aqueous dispersion of a sizing agent was weighed in a Petri dish (diameter 45 mm, depth 10 mm) made of aluminum, and the aqueous dispersion was dried for one hour in a hot air dryer at 105° C. Subsequently, the component remaining on the Petri dish was weighed. The mass of the aqueous dispersion of a sizing agent was designated as W1, the mass of the component remaining after drying was designated as W2, and the concentration of the sizing agent in the aqueous dispersion liquid was calculated by the following calculation formula.

Concentration (%) of sizing agent in aqueous dispersion of sizing agent=$\{W2/W1\}\times 100$ <Sizing Treatment of Carbon Fibers>

PYROFIL TRH50 30M (trade name, manufactured by Mitsubishi Chemical Corporation; number of filaments 30,000, fiber diameter 6 µm), which is a carbon fiber bundle to which a sizing agent is not applied, was immersed and passed through an immersion tank filled with an aqueous dispersion of a sizing agent, and then the carbon fiber bundle was dried for 10 minutes in an atmosphere at 140° C. and then wound around a bobbin. At this time, an aqueous dispersion of a sizing agent that had been adjusted to 30% by mass was used after the aqueous dispersion was diluted such that the concentration of the sizing agent in the aqueous dispersion of the sizing agent in the immersion tank would be about 2.2% by mass.

<Measurement of Amount of Adhesion of Sizing Agent in Carbon Fiber Bundle>

The amount of adhesion (mass %) of the sizing agent for carbon fiber with respect to the total mass of the sizing agent-adhered carbon fibers was measured by a Soxhlet extraction method using methyl ethyl ketone. The extraction time was set to 1 hour.

<Evaluation of Resin Impregnation>

The resin adhesion ratio was measured by the following method, and thus an evaluation of resin impregnation was carried out.

By using a FW apparatus, a resin was supplied to a carbon fiber bundle to which a sizing agent had been applied, with a touch roller, and the carbon fiber bundle was wound on an mandrel of an aluminum liner (total length 540 mm, body part length 415 mm, body part outer diameter 163 mm, and thickness of body part at the center 3 mm).

The touch roller had a diameter of ϕ200 mm, and 10 mm of the lower part of the touch roller was immersed in a resin bath. The touch roller was provided with a metal blade, and the clearance between the roller and the blade was set to 0.1 mm. jER828 was used as the resin, and the temperature of the resin was adjusted to 35° C. by immersing the resin bath in warm water. The top of this touch roller was brought into contact with the carbon fiber bundle adhered with the sizing agent at a wrap angle of 50°. Furthermore, the tow width on the sending side of the roll immediately before the touch roller was restricted to 9 mm with a metal guide having a diameter of ϕ10. The tension of the carbon fiber bundle immediately before contacting the touch roller was set to 2 kgf, and the winding speed was set to 10/min.

The carbon fiber bundle wound around the mandrel was unwound and cut out into five pieces each having a length of 1 m. The mass of each piece was measured, and the average of the masses of the five pieces was designated as "mass per unit length of carbon fiber bundle after resin supply".

Resin adhesion ratio (%)={Mass per unit length of carbon fiber bundle after resin supply−mass per unit length of carbon fiber bundle)/(mass per unit length of carbon fiber bundle after resin supply)}×100

The "mass per unit length of carbon fiber bundle" was obtained by unwinding the carbon fiber bundle from a carbon fiber bundle in a state of being wound around a paper tube (spool), cutting out the carbon fiber bundle into five pieces each having a length of 1 m, measuring the mass of each piece, and calculating the average mass of the masses of the five pieces.

As the resin adhesion ratio is larger, resin impregnation of the carbon fiber bundle is higher. The impregnation was rated such that, for the resin adhesion ratio of 16% or higher, impregnation was rated as A; higher than or equal to 14% and lower than 16%, as B; and lower than 14%, as C.

<Spontaneous Dispersibility Test>

Spontaneous dispersibility was evaluated by the method described above. In addition, jER828 (manufactured by Mitsubishi Chemical Corporation) was used as the evaluation liquid.

<Cantilever Test>

A cantilever value was measured by the following method, and this was used as an index for the bundling properties of a carbon fiber bundle. As the cantilever value is larger, the bundling properties of the carbon fiber bundle are superior. The bundling property was rated such that, for a cantilever value of 24.0 cm or larger, bundling property was rated as A; larger than or equal to 22.0 cm and less than 24.0 cm, as B; less than 22.0 cm, as C.

(Procedure 1)

Measurement is carried out in an air atmosphere at 25° C. On a measurement platform having a horizontal surface and an inclined surface inclining downward from one end (straight line shape) of the horizontal surface at an angle of inclination of 45 degrees, a carbon fiber bundle is unwound for 30 cm from the bobbin on the horizontal surface in a state without any twisting or disorderliness, and the end (straight line shape) of the carbon fiber bundle for test is aligned with the boundary line A between the inclined surface and the horizontal surface. At this time, the carbon fiber bundle for test is placed such that the surface that was faced to the outer side of the unwound bobbin is brought to the horizontal surface side. Then, a pressing plate is placed on the carbon fiber bundle for test, and the end (straight line shape) of the pressing plate is aligned with the boundary line A.

(Procedure 2)

Next, the pressing plate is moved in the horizontal direction toward the inclined surface at a speed of 0.5 cm/second, and movement of the pressing plate is stopped at a time point when the end of the carbon fiber bundle for test comes into contact with the inclined surface.

(Procedure 3)

The shortest distance between the point at which the end of the carbon fiber bundle comes into contact with the inclined surface in Procedure 2, and the boundary line A, is measured.

(Procedure 4)

Procedure 1 to Procedure 3 were carried out 10 times, and the simple average value of the values thus obtained was designated as the cantilever value.

<Evaluation of Interfacial Adhesiveness>

A release paper coated with a matrix resin formed from a B-stage epoxy resin #350 (Mitsubishi Chemical Corporation, 130° C. curing type) was prepared, and on the surface coated with the epoxy resin, 156 of the carbon fiber bundles were disposed in parallel to each other with a constant pitch. Subsequently, the carbon fiber bundles were impregnated with the epoxy resin through a heated compressing roller, and a protective film was laminated thereon. Thus, a unidirectionally aligned (UD) prepreg having a resin content of about 33% by mass, a carbon fiber basis weight of 250 g/m$^2$, and a width of 500 mm was produced.

Subsequently, a UD laminate having a thickness of 2 mm which has been prepared from the above-described UD prepreg has been cured and molded, and thereby a laminate plate as a carbon fiber composite material molded product was obtained.

The interfacial adhesiveness between the carbon fibers and the matrix resin in the laminate plate as a carbon fiber composite material molded product thus obtained was evaluated by the 90° flexural strength (according to ASTM-D-790) of the laminate plate.

As the 90° flexural strength is larger, it is implied that the adhesiveness between the carbon fibers and the matrix resin is satisfactory. The interfacial adhesiveness was rated such that, for a 90° flexural strength of 135 MPa or higher, interfacial adhesiveness was rated as A; higher than or equal to 125 MPa and lower than 135 MPa, as B; and lower than 125 MPa, as C.

The results are described together in Table 14.

<Evaluation of Fiber Spread Ratio A>

The fiber spread ratio A was evaluated by the method described in Example 1-1.

Examples 2-2 to 10-2 and Comparative Examples 1-2 to 6-2

Sizing agent-adhered carbon fiber bundles were obtained in the same manner as in Example 1-2, except that the components (A) to (E) described in Table 13 were mixed at the proportions (parts by mass) described in Table 14 or 15. An evaluation similar to that of Example 1-2 was carried out using the sizing agent-adhered carbon fiber bundles thus obtained. The results are presented in Tables 14 and 15.

TABLE 14

| | | | Example 1-2 | Example 2-2 | Example 3-2 | Example 4-2 | Example 5-2 | Example 6-2 | Example 7-2 | Example 8-2 | Example 9-2 | Example 10-2 |
|---|---|---|---|---|---|---|---|---|---|---|---|---|
| Sizing agent (parts by mass) | Component (A) | Ester A1 | 55 | 40 | 70 | 55 | 50 | 55 | 40 | 50 | 50 | |
| | | Ester A2 | | | | | | | | | | 55 |
| | | EPU-73B | | | | | | 15 | 20 | 30 | 10 | 15 |
| | Component (B) | HP7200H | 20 | 30 | 10 | 25 | 15 | 20 | 30 | 10 | 25 | 20 |
| | Component (C) | JER828 | | 20 | | 10 | 25 | | | | | |
| | | jER807 | 15 | | 10 | | | | | | 5 | |
| | Component (E) | Nonionic emulsifier | 10 | 10 | 10 | 10 | 10 | 10 | 10 | 10 | 10 | 10 |
| Amount of adhesion of sizing agent (mass %) | | | 0.9 | 1.1 | 1.2 | 1.0 | 1.1 | 1.0% | 0.9% | 0.9% | 1.2% | 1.1% |
| Component (A)/[component (A) + component (B) + component (C)] (mass %) | | | 61 | 44 | 78 | 61 | 56 | 67 | 52 | 67 | 59 | 67 |
| Component (B)/[component (A) + component (B) + component (C)] (mass %) | | | 22 | 33 | 11 | 28 | 17 | 22 | 33 | 11 | 28 | 22 |
| Component (C)/[component (A) + component (B) + component (C)] (mass %) | | | 17 | 22 | 11 | 11 | 28 | 11 | 14 | 22 | 13 | 11 |
| Evaluation results | Impregnation | Evaluation | A | B | A | B | A | B | B | A | B | B |
| | | Resin adhesion ratio | 16.3% | 14.5% | 16.5% | 15.2% | 16.1% | 15.1% | 14.6% | 16.6% | 15.5% | 15.7% |
| | Bundling properties | Evaluation | B | A | B | A | B | A | A | B | A | A |
| | | Cantilever value (cm) | 22.4 | 24.9 | 22.7 | 25.5 | 23.0 | 25.2 | 26.4 | 24.2 | 25.8 | 25.0 |
| | Interfacial adhesiveness | Evaluation | A | A | B | A | A | A | A | A | A | A |
| | | 90° bending stress (MPa) of laminate plate | 141 | 142 | 132 | 139 | 140 | 140 | 141 | 138 | 140 | 139 |
| | Tow width (mm) on bobbin | | 9.3 | 9.5 | 9.0 | 9.1 | 9.2 | 9.3 | 9.3 | 9.3 | 9.2 | 9.2 |
| | Spontaneous dispersibility | | 5.2 | 3.6 | 5.5 | 3.4 | 5.6 | 5.7 | 7.0 | 7.2 | 5.7 | 6.1 |
| | Fiber spread ratio A | | 115% | 111% | 120% | 115% | 123% | 118% | 113% | 124% | 117% | 121% |

TABLE 15

| | | | Comparative Example 1-2 | Comparative Example 2-2 | Comparative Example 3-2 | Comparative Example 4-2 | Comparative Example 5-2 | Comparative Example 6-2 |
|---|---|---|---|---|---|---|---|---|
| Sizing agent (parts by mass) | Component (A) | Ester A1 | 55 | | 30 | 90 | | |
| | | Ester A2 | | | | | | |
| | Component (B) | HP7200H | 35 | 55 | | | 85 | |
| | Component (C) | jER828 | | | 55 | | | 85 |
| | | jER807 | | 30 | | | | |
| | Component (E) | Nonionic emulsifier | 10 | 15 | 15 | 10 | 15 | 15 |
| Amount of adhesion of sizing agent (mass %) | | | 1.2 | 1.0 | 1.1 | 1.2 | 1.0 | 1.1 |
| Component (A)/[component (A) + component (B) + component (C)] (mass %) | | | 61 | 0 | 35 | 100 | 0 | 0 |
| Component (B)/[component (A) + component (B) + component (C)] (mass %) | | | 39 | 65 | 0 | 0 | 100 | 0 |
| Component (C)/[component (A) + component (B) + component (C)] (mass %) | | | 0 | 35 | 65 | 0 | 0 | 100 |

TABLE 15-continued

| | | | Comparative Example 1-2 | Comparative Example 2-2 | Comparative Example 3-2 | Comparative Example 4-2 | Comparative Example 5-2 | Comparative Example 6-2 |
|---|---|---|---|---|---|---|---|---|
| Evaluation results | Impregnation | Evaluation | C | C | B | C | C | A |
| | | Resin adhesion ratio | 12.5% | 13.6% | 15.2% | 13.5% | 12.3% | 17.5% |
| | Bundling properties | Evaluation | A | A | C | A | A | C |
| | | Cantilever value (cm) | 25.3 | 26.0 | 21.1 | 24.5 | 27.3 | 17.1 |
| | Interfacial adhesiveness | Evaluation | B | B | A | C | A | A |
| | | 90° bending stress (MPa) of laminate plate | 128 | 134 | 140 | 120 | 135 | 138 |
| | | Tow width (mm) on bobbin | 9.2 | 9.2 | 9.1 | 9.2 | 9.0 | 9.5 |
| | | Spontaneous dispersibility | 2.5 | 1.0 | 2.8 | 2.7 | 1.0 | 1.0 |
| | | Fiber spread ratio A | 109% | 112% | 147% | 115% | 107% | 163% |

TABLE 16

| Laminate No. | Winding angle (°) | Type of layer | Thickness of layer (mm) |
|---|---|---|---|
| 1 | 88.6 | Hoop layer | 2.03 |
| 2 | 11.0 | Helical layer | 0.58 |
| 3 | 11.0 | Helical layer | 0.58 |
| 4 | 65.0 | Hoop layer | 0.57 |
| 5 | 13.0 | Helical layer | 0.60 |
| 6 | 13.0 | Helical layer | 0.60 |
| 7 | 88.6 | Hoop layer | 0.72 |
| 8 | 11.0 | Helical layer | 0.62 |

According to an aspect of the invention, sizing agent-adhered carbon fibers and a sizing agent-adhered carbon fiber bundle, both having satisfactory characteristics in terms of all of impregnation with a matrix resin, handling in processing, and mechanical characteristics of the composite material can be obtained.

According to another aspect of the invention, sizing agent-adhered carbon fibers and a sizing agent-adhered carbon fiber bundle, both having satisfactory characteristics in terms of all of impregnation with a matrix resin, bundling properties, interfacial adhesiveness with a matrix resin, and ease of dispersing in a matrix resin can be obtained by using sizing for carbon fiber.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

1: Bobbin wound with sizing agent-adhered carbon fiber bundle
2: Fiber-spreading bar
3: Drive roller
4: Laser type length measurement sensor
10: Apparatus for measuring fiber spread ratio A

What is claimed is:

1. A sizing agent-adhered carbon fiber bundle comprising carbon fibers and a sizing agent for carbon fiber,
wherein a spontaneous dispersion ratio measured by the spontaneous dispersibility test is 3 or higher,
wherein the sizing agent for carbon fiber comprises a component (A), and a component (C),
the component (A) is at least one selected from the group consisting of component (A-1), and component (A-3),
the component (A-1) is a urethane compound having a structure of the following Formula (1-1) in the molecule:

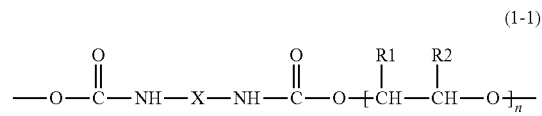

(1-1)

in the formula, X represents a divalent aromatic group, a divalent linear or branched aliphatic hydrocarbon group, or a divalent alicyclic hydrocarbon group; R1 and R2 each independently represent a methyl group or a hydrogen atom; and n represents an integer from 1 to 50, the component (A-3) is an amide compound having a structure of the following Formula (1-3) in the molecule:

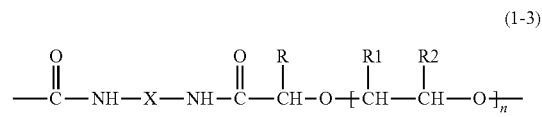

(1-3)

in the formula, X represents a divalent aromatic group, a divalent linear or branched aliphatic hydrocarbon group, or a divalent alicyclic hydrocarbon group; R, R1, and R2 each independently represent a methyl group or a hydrogen atom; and n represents an integer from 1 to 49, the component (C) is a bisphenol type epoxy compound or an aliphatic epoxy compound, and a sum of the component (A) and the component (C) is 40 to 75% by mass, and a content of the component (A) is from 12.25% by mass to 52.5% by mass, and a content of the component (C) is 19 to 68% by mass with respect to the total mass of the sizing agent for carbon fiber.

2. The sizing agent-adhered carbon fiber bundle according to claim 1,
wherein the sizing agent for carbon fiber further comprises a component (B),
wherein the component (B) is an epoxy compound selected from the group consisting of an epoxy compound represented by the following Formula (2), an epoxy compound represented by the following Formula (3), and an epoxy compound represented by the following Formula (4):

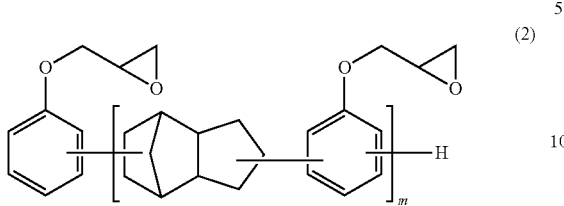

(2)

in the formula, m represents an integer from 1 to 5,

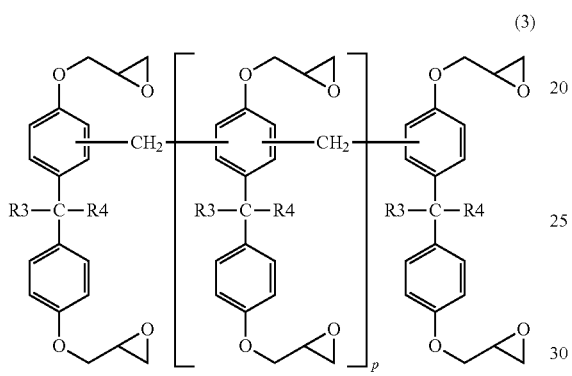

(3)

in the formula, R3 and R4 each independently represent a hydrogen atom or a saturated aliphatic hydrocarbon group having 1 to 4 carbon atoms; and p represents an integer from 0 to 5,

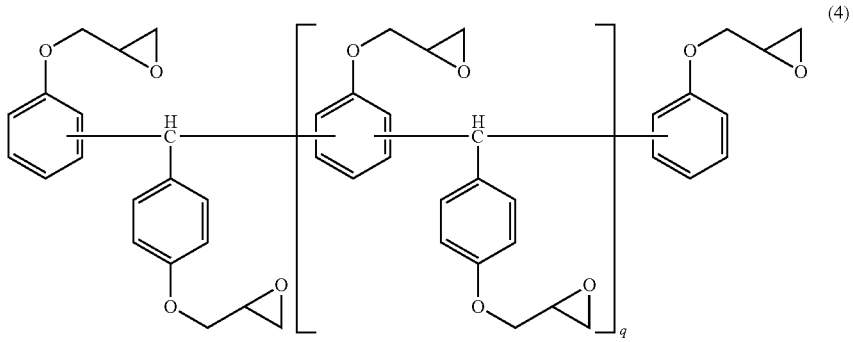

(4)

in the formula, q represents an integer from 0 to 5, wherein, when the component (A) is the component (A-1); the content of the component (A-1) is 10 to 52.5 parts by mass, the content of the component (B) is 15 to 55 parts by mass, and the content of the component (C) is 20 to 68 parts by mass, with respect to 100 parts by mass of the sum of the component (A), the component (B), and the component (C); and the sum of the component (A-1), the component (B), and the component (C) is 50% by mass or more with respect to the total mass of the sizing agent for carbon fiber, and wherein the carbon fiber bundle comprises the sizing agent for carbon fiber at a proportion of 0.1% to 5.0% by mass with respect to the total mass of the sizing agent-adhered carbon fiber bundle.

3. A method for producing a carbon fiber-reinforced composite material, the method comprising:
impregnating the sizing agent-adhered carbon fiber bundle according to claim 2 with a thermosetting resin composition, and heating and curing the thermosetting resin composition.

4. A method for producing a carbon fiber-reinforced pressure vessel, the method comprising:
impregnating the sizing agent-adhered carbon fiber bundle according to claim 2 with a thermosetting resin composition, heating and curing the thermosetting resin composition by a filament winding method, and thus producing a carbon fiber-reinforced pressure vessel.

5. A method for producing a carbon fiber-reinforced composite material, the method comprising:
impregnating the sizing agent-adhered carbon fiber bundle according to claim 1 with a thermosetting resin composition, and heating and curing the thermosetting resin composition.

6. A method for producing a carbon fiber-reinforced pressure vessel, the method comprising:
impregnating the sizing agent-adhered carbon fiber bundle according to claim 1 with a thermosetting resin composition, heating and curing the thermosetting resin composition by a filament winding method, and thus producing a carbon fiber-reinforced pressure vessel.

7. The sizing agent-adhered carbon fiber bundle according to claim 1, wherein a viscosity of the component (C) at 50° C. is 100 to 10,000 mPa·s.

8. The sizing agent-adhered carbon fiber bundle according to claim 1, wherein an epoxy equivalent of the component (C) is 160 to 400 g/eq, and a number average molecular weight of the component (C) is 340 to 800.

9. A sizing agent-adhered carbon fiber bundle comprising carbon fibers and a sizing agent for carbon fiber, wherein a spontaneous dispersion ratio measured by the spontaneous dispersibility test is 3 or higher, wherein the carbon fiber bundle comprises the sizing agent for carbon fiber at a proportion of 0.1% to 5.0% by mass with respect to the total mass of the sizing agent-adhered carbon fiber bundle, the sizing agent for carbon fiber comprises a component (A), a component (B), a component (C) and a surfactant (E), the component (A) is at least one selected from the group consisting of component (A-1), component (A-2), and component (A-3), the component (A-1) is a urethane compound having a structure of the following Formula (1-1) in the molecule:

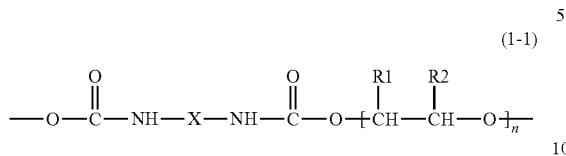
(1-1)

in the formula, X represents a divalent aromatic group, a divalent linear or branched aliphatic hydrocarbon group, or a divalent alicyclic hydrocarbon group; R1 and R2 each independently represent a methyl group or a hydrogen atom; and n represents an integer from 1 to 50, the component (A-2) is an ester compound having a structure represented by the following Formula (1-2) in the molecule:

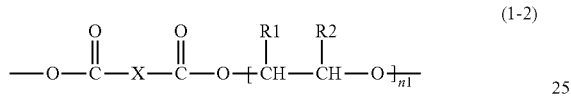
(1-2)

in the formula, X represents a divalent aromatic group, or a divalent alicyclic hydrocarbon group; R1 and R2 each independently represent a methyl group or a hydrogen atom; and n1 represents an integer from 1 to 50, the component (A-3) is an amide compound having a structure of the following Formula (1-3) in the molecule:

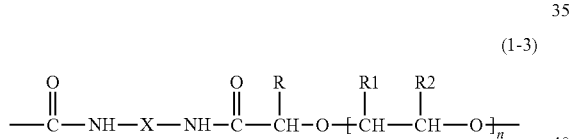
(1-3)

in the formula, X represents a divalent aromatic group, a divalent linear or branched aliphatic hydrocarbon group, or a divalent alicyclic hydrocarbon group; R, R1, and R2 each independently represent a methyl group or a hydrogen atom; and n represents an integer from 1 to 49, the component (B) is an epoxy compound selected from the group consisting of an epoxy compound represented by Formula (2), an epoxy compound represented by Formula (3), and an epoxy compound represented by Formula (4):

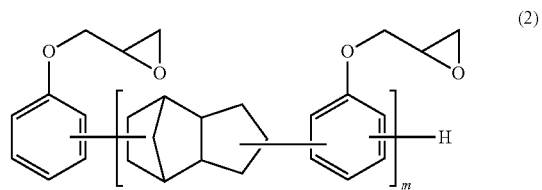
(2)

wherein m represents an integer from 1 to 5,

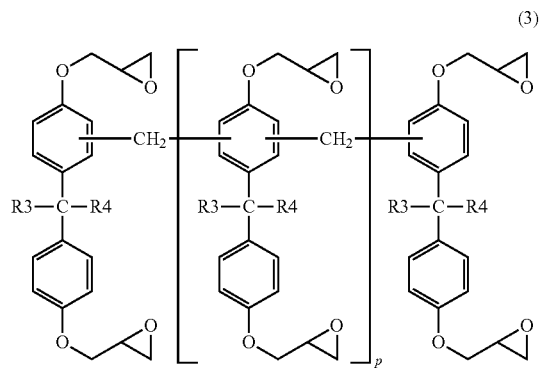
(3)

wherein R3 and R4 each independently represent a hydrogen atom or a saturated aliphatic hydrocarbon group having 1 to 4 carbon atoms; and p represents an integer from 0 to 5,

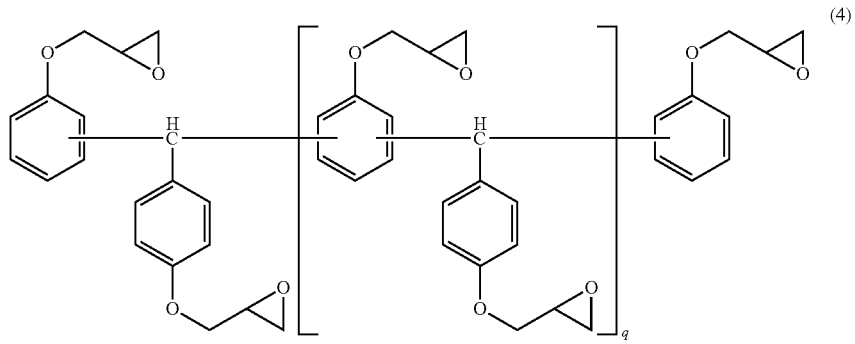
(4)

wherein q represents an integer from 0 to 5,
the component (C) is a bisphenol type epoxy compound or an aliphatic epoxy compound, and
the surfactant (E) is an anionic or nonionic surfactant,
a sum of the component (A) and the component (C) is 40 to 75% by mass, and a content of the component (A) is from 12.25 mass % to 52.5% by mass, and a content of the component (C) is 19 to 68% by mass with respect to the total mass of the sizing agent for carbon fiber.

* * * * *